United States Patent
Yamamoto

(10) Patent No.: US 7,378,632 B2
(45) Date of Patent: May 27, 2008

(54) IMAGE DISPLAY APPARATUS AND IMAGE PICKUP APPARATUS USING THE SAME

(75) Inventor: Akira Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 11/432,738

(22) Filed: May 10, 2006

(65) Prior Publication Data

US 2006/0268234 A1    Nov. 30, 2006

(30) Foreign Application Priority Data

May 11, 2005    (JP)    ............... 2005-138524

(51) Int. Cl.
    *G09G 5/00*    (2006.01)
(52) U.S. Cl. .................. 250/205; 345/8; 359/223; 359/197; 359/212
(58) Field of Classification Search ............. 250/208.1, 250/205; 345/8; 353/30; 359/197, 212, 359/223
    See application file for complete search history.

(56) References Cited

U.S. PATENT DOCUMENTS

| | | | |
|---|---|---|---|
| 5,467,104 A | | 11/1995 | Furness, III et al. |
| 5,701,132 A | | 12/1997 | Kollin et al. |
| 5,903,397 A | * | 5/1999 | Melville et al. ............. 359/630 |
| 6,043,799 A | * | 3/2000 | Tidwell ......................... 345/7 |
| 6,281,862 B1 | * | 8/2001 | Tidwell et al. ................ 345/32 |
| 6,362,912 B1 | | 3/2002 | Lewis et al. |
| 6,445,362 B1 | * | 9/2002 | Tegreene ........................ 345/7 |
| 6,945,652 B2 | * | 9/2005 | Sakata et al. ................. 353/30 |
| 2004/0145539 A1 | * | 7/2004 | Okamoto et al. ............... 345/8 |
| 2005/0068255 A1 | * | 3/2005 | Urakawa ....................... 345/7 |

FOREIGN PATENT DOCUMENTS

| | | |
|---|---|---|
| JP | 10-301052 | 11/1998 |
| JP | 2001-4955 | 1/2001 |
| JP | 2001-194617 | 7/2001 |
| JP | 2002-218300 | 8/2002 |
| JP | 2004-45496 | 2/2004 |

* cited by examiner

*Primary Examiner*—Stephen Yam
(74) *Attorney, Agent, or Firm*—Morgan & Finnegan, LLP

(57) ABSTRACT

Provided is an image display apparatus, including: a light source for emitting a modulated light beam based on image information; a conversion optical system for converting the light beam from the light source into a convergent light beam; a scanning member for two-dimensionally scanning the light beam from the conversion optical system; a scanning optical system for imaging the light beam scanned by the scanning member onto a surface to be scanned; and an ocular optical system for observing a two-dimensional image formed on the surface to be scanned, in which the scanning optical system includes a reflective surface which is rotationally asymmetric, and the reflective surface of the scanning optical system has a positive power in a position in which a center light beam is incident on the reflective surface.

9 Claims, 14 Drawing Sheets

——————— 656.27nm
— - — - — 587.66nm
- - - - - - - 486.13nm

— 656.27nm
—·—·— 587.66nm
------- 486.13nm

IMAGE DISPLAY APPARATUS AND IMAGE PICKUP APPARATUS USING THE SAME

BACKGROUND OF THE INVENTION

1. Field of the Invention

The present invention relates to a scanning image display apparatus for observing a two-dimensional image formed by two-dimensional scanning with a modulated light beam based on image information, and is suitable for use in, for example, an electronic view finder which is mounted on an image pickup apparatus such as a digital still camera or a video camera, or a head mount display.

2. Related Background Art

Up to now, there have been proposed image display apparatuses without a two-dimensional display device which is so called a flat panel, such as a transmission liquid crystal element, a reflection liquid crystal element, and an organic EL element. In the image display apparatuses, a predetermined surface is two-dimensionally scanned with a light beam by a scanning member and an image is displayed for observation.

For example, there have been proposed scanning image display apparatuses of a retina direct image drawing type, in which a light beam emerged from a light source is scanned two-dimensionally to directly form an image on the retina of an observer (U.S. Pat. No. 5,467,104 and U.S. Pat. No. 5,701,132). In the image display apparatuses of a retina scanning type which is disclosed in U.S. Pat. No. 5,467,104, the light beam which is two-dimensionally scanned is imaged onto a intermediate image plane and then imaged onto the retina of the observer through an ocular optical system (eyepiece), thereby forming a two-dimensional image on the retina thereof. For the image display apparatus, it is necessary to scan light at very high speed, so a very small scanning member is used for a scanning portion such as a mirror for scanning light. An example of the scanning member of the scanning image display apparatus which is to be used is a mirror which is compact, lightweight, and operable at high speed. The mirror is produced using a microelectro mechanical system (MEMS) technique.

The light beam scanned in the image display apparatuses is very thin, so that the diameter of the light beam in a pupil position of the observer becomes very small.

A method of enlarging the small diameter of exit pupil is disclosed in U.S. Pat. No. 5,701,132. According to the method disclosed in U.S. Pat. No. 5,701,132, a light diffusing means such as a lens array or a diffusion plate is disposed on an intermediate imaging surface having a formed curvature, and a scanned beam is made incident on the light diffusing means. Therefore, when the beam passes through the light diffusing means, the spread angle of the beam increases.

Japanese Patent Application Laid-open No. 2001-004955 or Japanese Patent Application Laid-open No. 2001-194617 discloses an image display apparatus using a prism member which has a rotationally asymmetric surface and is made of a material whose refractive index n is equal to or larger than 1. When the prism member is used, an optical path is folded to reduce a size of an optical system and a length of the optical path is set to be n times (n>1) an actual light traveling distance to ensure a long optical path length. However, in the optical system, the intermediate imaging surface is included in the prism member, so the light diffusing means disclosed in U.S. Pat. No. 5,701,132 cannot be used.

Japanese Patent Application Laid-open No. 2004-045496 discloses an optical system using a prism filled with a medium whose refractive index is larger than 1, serving as an optical system for imaging a scanned light beam on a surface to be scanned. In the optical system, an image formed on the surface to be scanned is observed through an ocular optical system including a diffusion plane disposed to the surface to be scanned.

For example, a structure including a lens (refractive optical element) or a structure including a prism member and a lens can be applied to the optical system for imaging the light beam scanned by the scanning member onto the intermediate image plane. In the case of the optical system using the refractive optical element, when remaining chromatic aberration is large, image quality deteriorates. In order to correct the chromatic aberration of the optical system, optical elements having different dispersions are necessary. Therefore, the entire optical system becomes larger in size.

When the light beam from the light source is incident on the scanning member at a large angle, a so-called scanning distortion is caused on an image formed on the surface to be scanned.

By employing a structure in which the surface to be scanned is scanned simultaneously with a plurality of light beams emitted from a light source having a plurality of light emitting points, a two-dimensional image can be formed at high speed.

Here, assume that the plurality of light emitting points are linearly or two-dimensionally arranged and each of light beams from the light emitting points is converted into a light beam having a predetermined shape (beam diameter is adjusted) to be made incident on the scanning member. In such a case, when a suitable optical system is not constructed in order to guide the light beams from all the light emitting points onto the surface to be scanned while desirable optical performances thereof are maintained, the quality of a formed image significantly deteriorates.

SUMMARY OF THE INVENTION

In view of the above, an image display apparatus according to this invention includes: a light source for emitting a modulated light beam based on image information; a conversion optical system for converting the light beam from the light source into a convergent light beam; a scanning member for two-dimensionally scanning the light beam from the conversion optical system; a scanning optical system for imaging the light beam scanned by the scanning member onto a surface to be scanned; and an ocular optical system for observing a two-dimensional image formed on the surface to be scanned, and in the image display apparatus, the scanning optical system includes a reflective surface which is rotationally asymmetric, and the reflective surface of the scanning optical system has a positive power in a position in which a center light beam is incident on the reflective surface.

The above and other objects, features, and advantages of the invention will become more apparent from the following detailed description taken in conjunction with the accompanying drawings.

DESCRIPTION OF THE PREFERRED EMBODIMENTS

An object of each of embodiments of the present invention is to provide an image display apparatus capable of easily displaying a high-quality image on a surface to be scanned and scanning the surface to be scanned with light beams from a plurality of light emitting points to form a preferable image at high speed in the case where a light source having the plurality of light emitting points is used.

Embodiment 1

Figure 1:
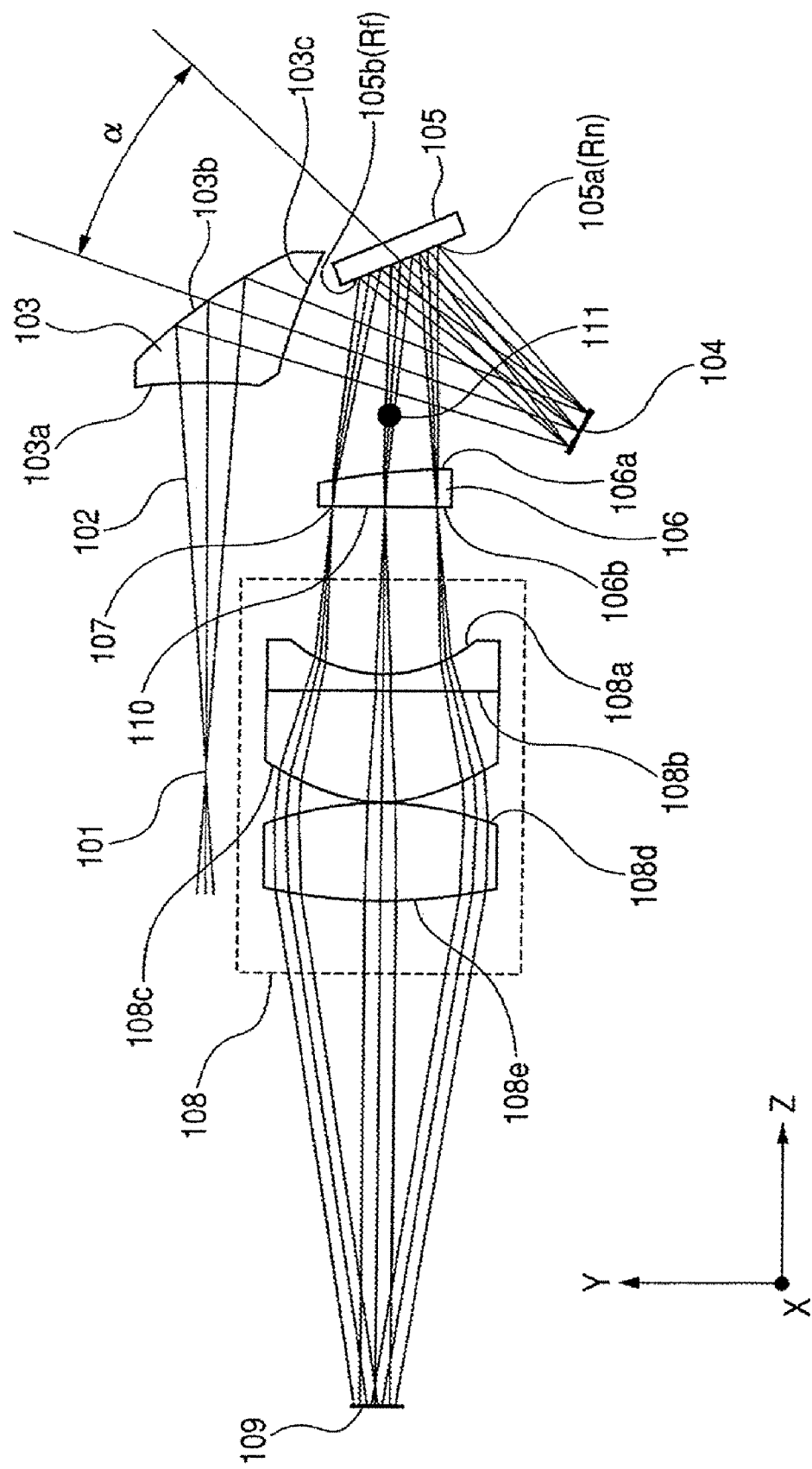
FIG. 1 is an optical sectional diagram showing an image display apparatus according to Embodiment 1 of the present invention.

FIG. 1 is a vertical section diagram showing a scanning image display apparatus according to Embodiment 1 of the present invention. In FIG. 1, a light source 101 emits a directly modulated light beam based on an input signal of a display image which is not shown. A light beam 102 emerged from the light source 101 is converted into a beam having a predetermined diameter by a X-conversion optical system X-103 and becomes incident on a scanning member 104. The light beam incident on the scanning member 104 is two-dimensionally scanned by the scanning member 104 and becomes incident on a scanning optical system 105 having a reflective surface. The light beam incident on the scanning optical system 105 passes through a field lens 106 and is imaged onto a surface (106b), which is on the opposite side of the scanning optical system 105, of the field lens 106 or a surface to be scanned 110 close thereto to form a spot 107. The surface to be scanned 110 is scanned with the light beam 102 by the scanning member 104. At this time, the spot 107 two-dimensionally moves on the surface to be scanned (image plane) 110 and the light beam 102 from the light source 101 is directly modulated in accordance with the movement of the spot, thereby forming a two-dimensional image on the surface to be scanned 110. The two-dimensional image formed on the surface to be scanned 110 is an aerial image. An observer directly observes the aerial image or observes an enlarged aerial image as a virtual image through an ocular optical system 108. Therefore, the image based on the modulated light beam in the light source 101 is observed. When a pupil (eye) is located in a position of exit pupil 109 of the ocular optical system 108 or a position close thereto, the observer can observe the image. An intensity modulation method, a pulse width modulation method, or the like can be used as a light modulating method for the light source 101. Instead of direct modulation, an acousto-optic element or the like may be used to modulate the light beam outside the light source. That is, a structure for modulating the light beam emerged from the light source by the acousto-optic element or the like and guiding the modulated light beam to the optical system 103 may be used.

In each of Embodiment 1 and subsequent embodiments, the following items are assumed as common items. A light beam passing through an optical path corresponding to the middle of a scanning angle in each direction of two-dimensional (vertical and horizontal) scanning performed by the scanning member 104, within optical paths from the scanning member 104 to the surface to be scanned 110 through the scanning optical system 105 is defined as a center light beam. An intersection between the center light beam and each member of the scanning optical system 105 is defined as a hit point. A ray passing through the center or the barycenter of the center light beam is defined as a principal ray of the center light beam. A long side of a scanning screen is set as a horizontal direction (X-direction) and a short side thereof is set as a vertical direction (Y-direction). Note that the long side may be set as the vertical direction and the short side may be set as the horizontal direction. A plane including the principal ray of the center light beam (principal ray is reflected to form the plane) on the optical path from the scanning member 104 to the surface to be scanned 110 is defined as a vertical section (YZ-section). A straight direction of the surface to be scanned 110 which is parallel with the vertical section is defined as the vertical direction. A surface which is orthogonal to the vertical section and includes a scanning center is defined as a horizontal section (XZ-section). Assume that a radius of local curvature in a vertical sectional direction at an intersection 105a between the principal ray of a light beam and the refractive surface of the scanning optical system 105 in the case where the light beam to be scanned is moved to a side closest to the scanning member 104 within the vertical section (YZ-section) of the scanning optical system 105, is expressed by Rn. Assume that a radius of local curvature in the vertical sectional direction at an intersection 105b between the principal ray of a light beam and the refractive surface of the scanning optical system in the case where the light beam to be scanned is moved to a side farthest from the scanning member 104 within the vertical section of the scanning optical system 105 is expressed by Rf.

In Embodiment 1, the field lens 106 is located between the scanning optical system 105 and the image plane (surface to be scanned) 110. The field lens 106 has an effect of allowing a ray to telecentrically enter the ocular optical system 108. By giving the field lens 106 a telecentric characteristic, a change in size of an image observed by the observer is prevented, even when the ocular optical system 108 is moved in the optical axis direction thereof to perform diopter adjustment. The position of the field lens 106 is not limited to the position between the scanning optical system 105 and the surface to be scanned 110. Therefore, the field lens 106 may be located between the surface to be scanned 110 and the ocular optical system 108. A Fresnel lens instead of the field lens may be located on the surface to be scanned 110 or in the vicinity thereof to change only the orientation of the ray. When the field lens is not located, an ocular optical system may be constructed so as not to change the size of the image even in the case where the diopter adjustment is performed. In Embodiment 1, a coaxial optical system is located as the ocular optical system. However, the present invention is not limited to this and thus a decentration optical system may be employed.

Figure 17:
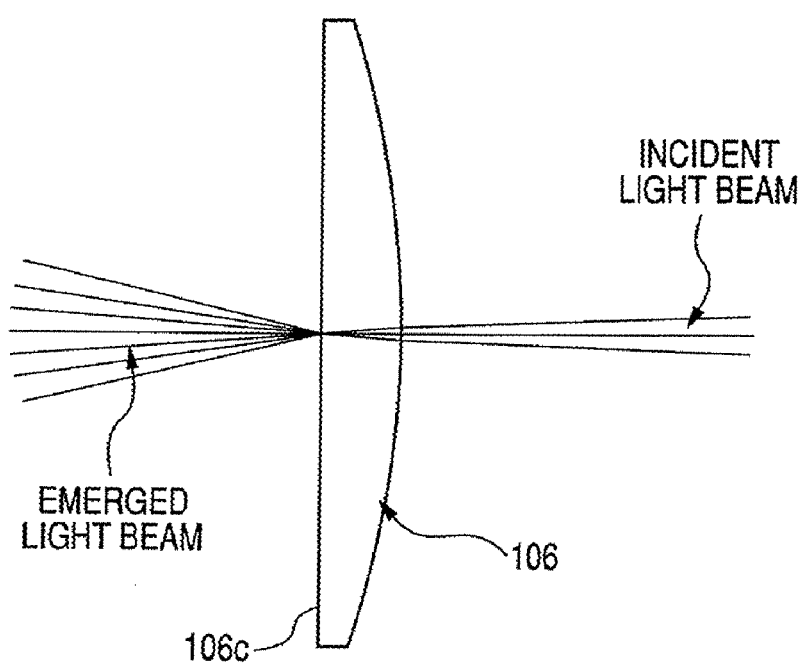
FIG. 17 is an explanatory view showing a field lens in Embodiment 1 of the present invention.

In a display optical system (including 103 to 106) in Embodiment 1, a very small mirror is used as the scanning member 104 because of the limitation on the size of the optical system. When the very small mirror is used; the diameter of a scanned light beam thins, with the result that a diameter of exit pupil becomes smaller. Therefore, it may be difficult to align the eye (pupil) of the observer with the position of the exit pupil. In order to facilitate the alignment, although not shown, an optical member (diffusion member) having a light diffusion function for increasing a divergent angle of an emerged light beam relative to a convergent angle of an incident light beam may be located on the surface to be scanned 110 or in the vicinity thereof. Thus, the diameter of exit pupil increases, so that the image can be easily observed. As shown in FIG. 17, when a surface 106c of the field lens 106 is a flat surface, the diffusion member may be formed on the flat surface. An image of a thin beam may be observed without using the optical member having the light diffusion function.

The optical system 103 includes an optical element (prism) having three optical surfaces, that is, an incident surface 103a, a reflective surface 103b, and an exit surface 103c, which are located in the order in which the light beam emerged from the light source 101 travels. In the optical system 103, the reflective surface 103b has the principal power of the optical system 103. Each of the three optical surfaces of the optical system 103 is a rotationally asymmetric surface without a rotationally symmetric axis, thereby correcting eccentric (decentration) aberration caused by obliquely locating the optical surface relative to the light beam. The optical system 103 may be composed of a plurality of optical elements.

Hereinbelow, features of Embodiment 1 will be described.

(1) The reflective surface of the scanning optical system 105 has a positive optical power at a hit point. In Embodiment 1, the scanning optical system 105 has a function for correcting a curvature of field caused by mainly the scanning member 104. Therefore, the reflective surface of the scanning optical system 105 has an optical power for forming an image at an increased distance from the scanning member 104 with the shift of position from the center of the image to the circumference thereof. At this time, when the optical power of the scanning optical system 105 in the center of the image is negative, a stronger negative optical power is required in the circumference of the image, making it more difficult to perform aberration correction with the shift of position to the circumference of the image. There is the positive optical power in the vicinity of the center of the image, so that a surface optical power becomes weaker with the shift of position to the circumference. As a result, only a weak optical power is applied to a light beam which is incident on the reflective surface in a significantly oblique manner, thereby preventing the occurrence of aberration.

(2) Assume that, the radius of local curvature within the vertical section at the intersection 105a closest to the scanning member 104, of respective intersections between the reflective surface of the scanning optical system 105 and each principal ray of a scanning light beam within a vertical section (YZ-plane) including the center light beam on the optical path from the scanning member 104 to the surface to be scanned 110 is expressed by Rn. Assume that the radius of local curvature within the vertical section at the intersection 105b farthest from the scanning member 104, of the respective intersections is expressed by Rf. In this case, a curvature radius ratio $\phi$ (=Rf/Rn) satisfies the following condition.

$$1 < \phi < 2$$

This is because, an incident angle of a light beam incident on the scanning optical system 105 becomes larger on a side farther from the scanning member 104, thereby increasing an apparent power of the scanning optical system 105 in the sectional direction. When the curvature radius ratio exceeds an upper limit of the above-mentioned range, an optical path difference between the side farthest from the scanning member 104 and the side closest thereto becomes larger, thereby making it difficult to perform correction using a single mirror. On the other hand, when the curvature radius ratio is smaller than a lower limit of the range, the optical power on the side farthest from the scanning member 104 is stronger than that on the side closest thereto, thereby making it difficult to correct the curvature of field.

(3) When an angle formed between a principal ray of an incident light beam which is emerged from the optical system 103 and is incident on the scanning member 104 and a principal ray of a light beam on the optical path from the scanning member 104 to the scanning optical system 105, of the center light beam is expressed by $\alpha$ (degrees), the following condition is satisfied.

$$10° < \alpha < 40°$$

When the light beam is obliquely incident on the scanning member 104, so-called scanning distortion is caused on the surface to be scanned 110. In order to suppress the scanning distortion as much as possible, it is desirable to minimize the incident angle. When the angle exceeds an upper limit of the above-mentioned range, the scanning distortion significantly occurs, making it also difficult to perform electrical correction. On the other hand, when the angle is smaller than a lower limit of the range, the incident light on the scanning member 104 physically interferes with the light beam scanned by the scanning member 104, so it is not preferable.

(4) When a magnification of the center light beam in a vertical direction (Y-direction) on the surface to be scanned 110 is expressed by Pv and a magnification thereof in a horizontal direction (X-direction) thereon is expressed by Ph, the following conditions are satisfied.

$$1 < Pv < 5$$

$$1 < Ph < 5$$

When each of the magnifications exceeds an upper limit, a light source image on the surface to be scanned 110 becomes larger and the resolution of a generated image reduces. On the other hand, when each of the magnifications is too small, an interval between spots on the surface to be scanned 110 widens. As a result, scanning lines are recognized by the observer, so the quality of the image deteriorates.

(5) A structure in which the incident light beam on the scanning member 104 intersects with the center light beam is used. According to the structure, it is possible to shorten a depth length of the optical system as viewed from the observer side. When an application to an electronic view finder is expected, an optical system having a long depth length is not preferable. A structure in which the center light beam and the incident light beam do not intersect with each other can be employed. However, due to a physical configuration with the scanning member 104, a magnification of the light source image is liable to become larger, making it difficult to maintain high resolution.

(6) When a radius of local curvature within the vertical section (YZ-section) of the scanning optical system 104 at each position within the vertical section including the center light beam is expressed by RY and a radius of local curvature in a direction orthogonal to the vertical section is expressed by RX, the following condition is satisfied.

RY>RX

The light beam is obliquely incident on the scanning optical system 105 within the vertical section (YZ-plane). Therefore, when the same radius of local curvature is provided, an apparent optical power within the vertical section becomes larger than an optical power within the horizontal section orthogonal to the vertical section, thereby causing astigmatism. Thus, the radius of local curvature RY within the vertical section is constantly set to a value larger than the radius of local curvature RX within the horizontal section orthogonal to the vertical section to prevent occurrence of the astigmatism.

The six features described above apply to Embodiments 2 and 3 described below.

Figure 2A:
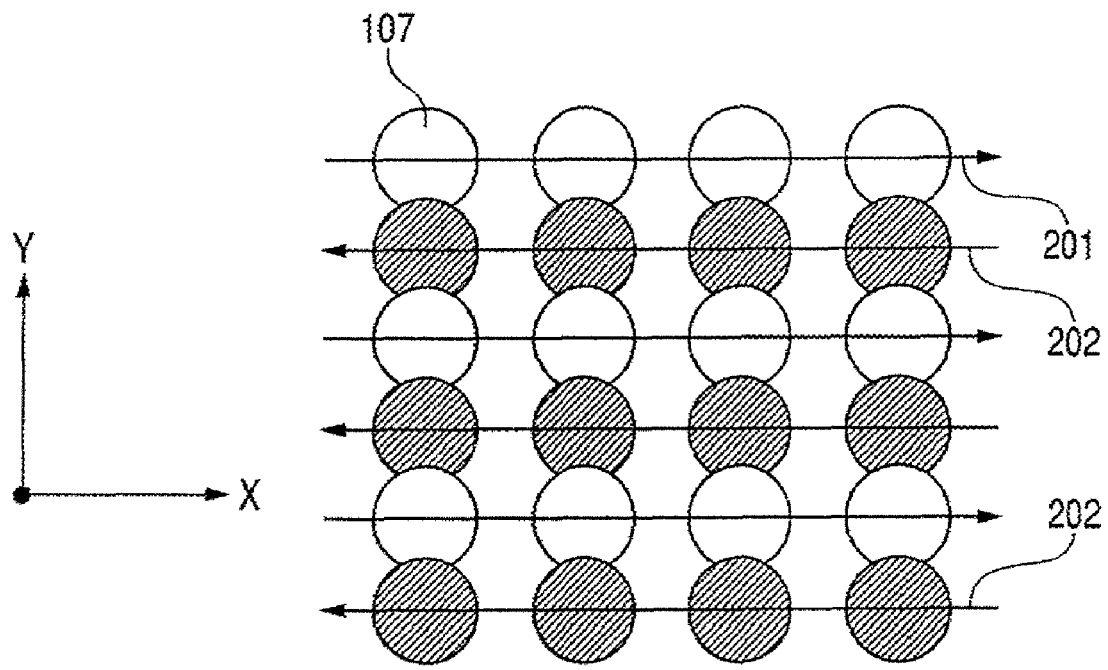
FIGS. 2A and 2B are explanatory views related to image generation in Embodiment 1 of the present invention.
Figure 2B:
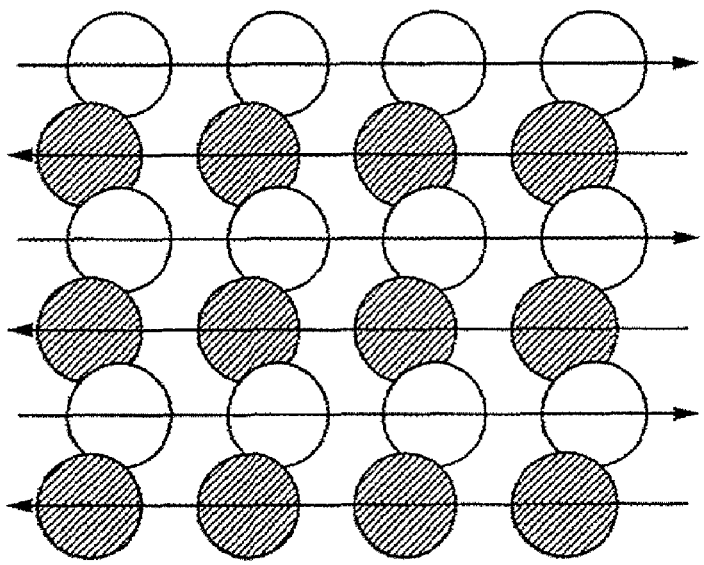

The image generation in the scanning image display apparatus according to Embodiment 1 will be described with reference to FIGS. 2A and 2B. FIGS. 2A and 2B show the movement of a spot 107 on the surface to be scanned 110. As shown in FIGS. 2A and 2B, the spot 107 subjected to raster scanning is moved on the surface to be scanned in a lateral direction (horizontal direction or X-direction) at high speed and moved thereon in a longitudinal direction (vertical direction or Y-direction) at low speed (speed slower than the scanning speed in the lateral direction). Therefore, a two dimensional image is formed on the surface to be scanned 110. At this time, as shown in FIGS. 2A and 2B, the image is formed while the spot 107 to be moved is subjected to round trip scanning including not only scanning from the left to the right (forward scanning 201) but also scanning from the right to the left (backward scanning 202).

In the case of round trip scanning, when a drawing start position of the line 201 drawn from the left to the right is shifted from that of the line 202 drawn from the right to the left, an image formed by the forward scanning 201 is misaligned from an image formed by the backward scanning 202, as shown in FIG. 2B, thereby reducing the resolution. In order to prevent this, in Embodiment 1, as shown in FIG. 1, a photo detector 111 is disposed on the optical path to detect a timing of the spot 107 passing through a specific position (detect synchronization signal), thereby preventing the images formed by the round trip scanning from misalignment.

As shown in FIG. 1, a part of a light beam guided to the frontward side of the paper is incident on the photo detector 111 by a mirror which is not shown. When the photo detector 111 is disposed in optically the same position as that of the surface to be scanned 110, a condensed spot becomes incident on the photo detector 111, thereby improving the resolution of the photo detector 111. In the above description, the scanning is performed in the lateral direction at high speed and performed in the longitudinal direction at low speed. The longitudinal direction may be exchanged with the lateral direction. However, the scanning may be performed in the longitudinal direction at high speed and performed in the lateral direction at low speed.

Figure 3:
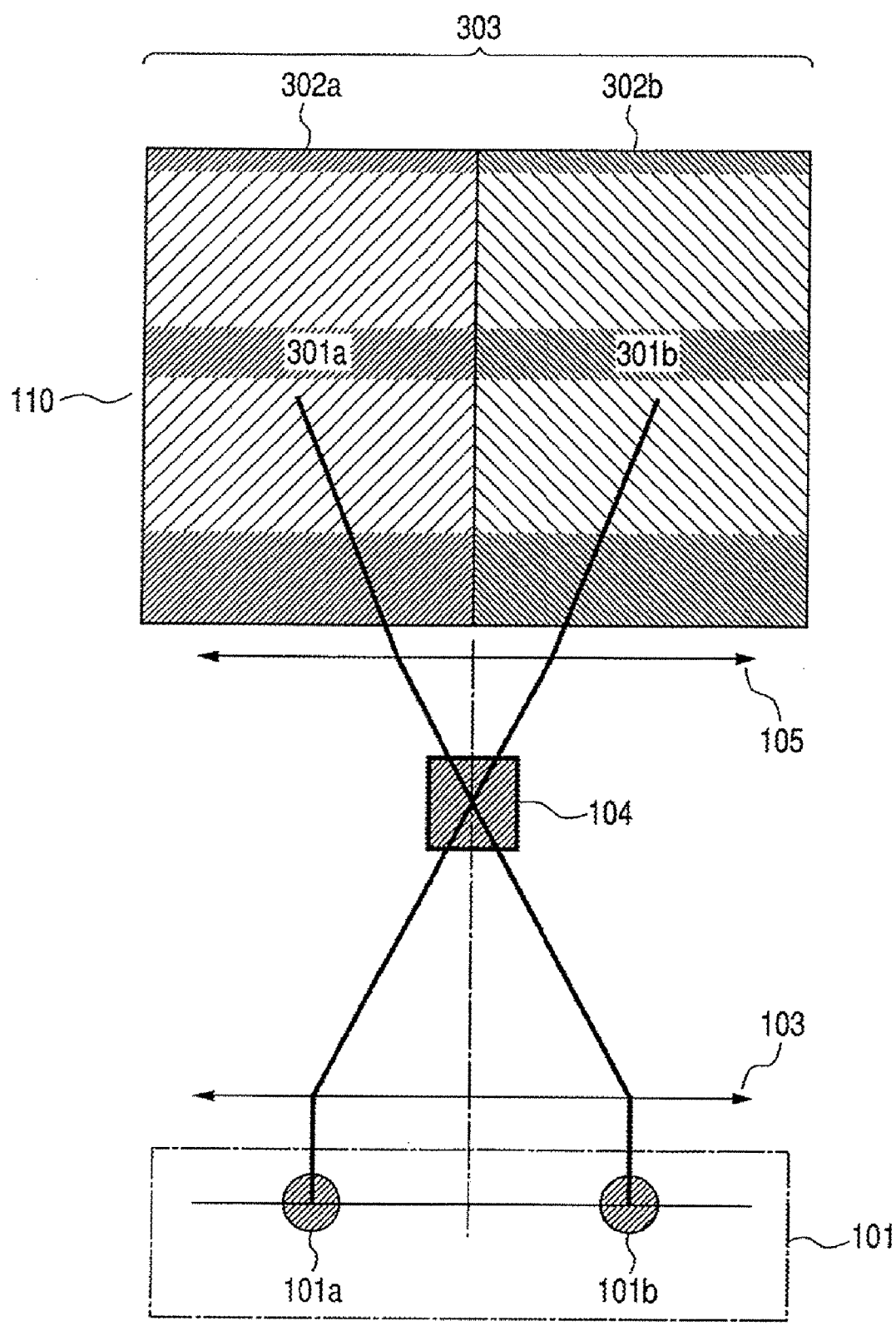
FIG. 3 is an explanatory view related to image generation using an array light source element in Embodiment 1 of the present invention.

In Embodiment 1, an array light emitting device in which light emitting points are discretely arranged is used as the light source 101. When a scan image is to be formed using a light source having a plurality of light emitting points, the structure described in, for example, U.S. Pat. No. 6,362,912 can be applied. U.S. Pat. No. 6,362,912 describes a method of scanning light beams emerged from two to four fiber ends and combining respective drawing regions on the surface to be scanned to form a single scan image. The array light emitting device in Embodiment 1 and a drawing method in the case when it is used will be described with reference to FIG. 3. To explain it simply, only a principal ray of a light beam emerged from the light source is shown in FIG. 3. Similarly, the optical system 103 and the scanning optical system 105 are simplified. The field lens 106 is omitted for simplification. In Embodiment 1, the light source 101 includes two light emitting points 101a and 101b. Light beams emerged from the two light emitting points 101a and 101b are guided onto the scanning member 104 through the optical system 103 and two-dimensionally scanned by the scanning member 104. The scanned beams are imaged onto the surface to be scanned 110 by the scanning optical system 105. That is, the two light emitting points 101a and 101b become conjugate with the surface to be scanned 110. The scanning member 104 is located in a pupil position of the optical system from the light source 101 to the surface to be scanned 110. At this time, spots 301a and 301b corresponding to the light emitting points 101a and 101b move within drawing regions 302a and 302b on the surface to be scanned 110, thereby drawing images corresponding to the drawing regions. When the two drawing regions 302a and 302b are combined, an image indicated by a region 303 can be drawn. A boundary between the two drawing regions 302a and 302b is electrically processed to perform correction so the boundary cannot be recognized. In Embodiment 1, the two light emitting points 101a and 101b are provided. However, the number of light emitting points is not limited to two and thus can be freely selected corresponding to a range up to ½ of the horizontal resolution of the drawn image. For example, assume that light emitting points are provided at ½ pitch of the horizontal resolution. In such a case, when scanning is performed corresponding to a vertical resolution of a target image in the vertical direction and is performed corresponding to one pixel in the horizontal direction, an image having target resolution can be obtained. A light source having very small light emitting points, such as a laser, an LED, or an organic EL device can be selected as the light source. In Embodiment 1, only a single light source corresponding to each of the light emitting points is described. However, light sources for emitting light beams having wavelengths corresponding to respective colors of red, green, and blue may be actually located in positions of the respective light emitting points to superimpose the colors on the surface to be scanned, thereby generating a color image.

Figure 4:
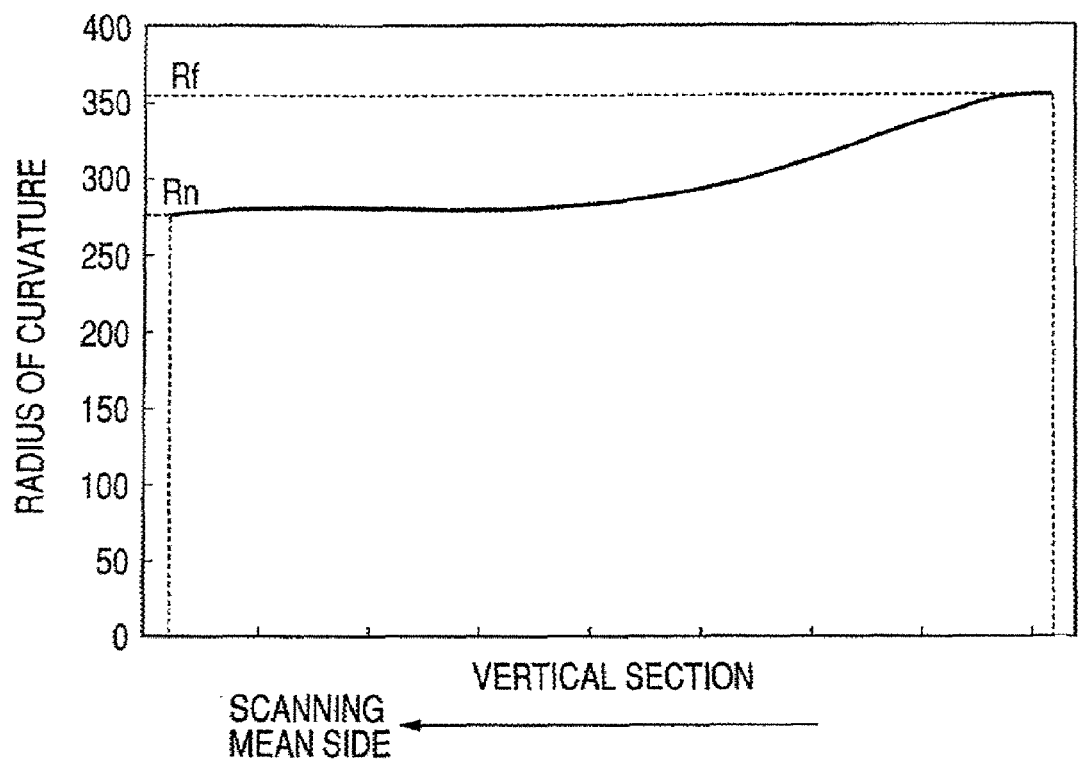
FIG. 4 is an explanatory graph showing a radius of local curvature on a vertical section of a scanning optical system in Embodiment 1 of the present invention.

FIG. 4 shows a change in radius of local curvature within the vertical section (YZ-plane) of the scanning optical system 105, including the center light beam traveling from the scanning member 104 to the surface to be scanned 110 in Embodiment 1. In FIG. 4, the ordinate indicates a radius of curvature and the abscissa indicates a position in a sectional direction. In the abscissa direction, a position is closer to the scanning member 104 as it is shifted to the left. In addition, the position is farther from the scanning member 104 as it is shifted to the right. As shown in FIG. 4, the radius of curvature Rf on the side farther from the scanning member 105 becomes larger than the radius of curvature Rn on the side closer to the scanning member 105.

When the scanning optical system 105 includes not an optical transmission surface but only a surface reflective surface, chromatic aberration is not caused in the scanning optical system 105. Therefore, an image higher in quality, compared to a case where the scanning optical system 105 includes an optical member having the optical transmission surface, such as a prism, can be formed. The surface reflective mirror 105 includes a rotationally asymmetric surface without a rotationally symmetric axis. Because the rotationally asymmetric surface is provided, eccentric aberration caused by obliquely locating the reflective mirror, having an optical power, relative to the light beam is suppressed.

Figure 5:
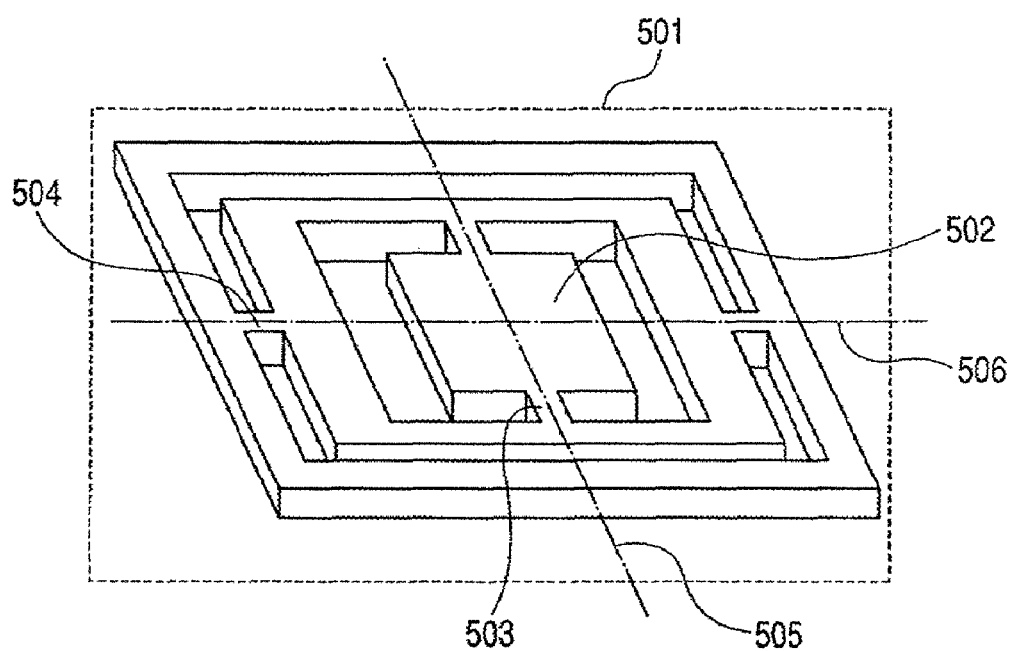
FIG. 5 is an explanatory view sowing an example of a scanning member in Embodiment 1 of the present invention.

FIG. 5 is an explanatory view showing a microelectro mechanical system (MEMS) scanning device 501 produced by a semiconductor process technique, as the scanning member. The deflection device 501 has a structure in which a very small mirror 502 having a deflective surface (reflective surface) is supported by torsion bars 503 and 504. The very small mirror 502 is subjected to resonant reciprocating motion substantially about an axis 505 by the twist of the torsion bar 503. In addition, the very small mirror 502 is subjected to resonant reciprocating motion substantially about an axis 506 by the twist of the torsion bar 504. According to the resonant reciprocating motions, while a normal direction of the reflective surface 502 two-dimensionally changes, a light beam incident on the very small mirror 502 is reflected, thereby performing two-dimensional scanning. The MEMS scanning device is used to reduce a size of the scanning member 104. The scanning member 104 may be another scanning member such as a combination of two one-dimensional rotary polygonal mirrors or a combination of two one-dimensional MEMS scanning devices.

Figure 12A:
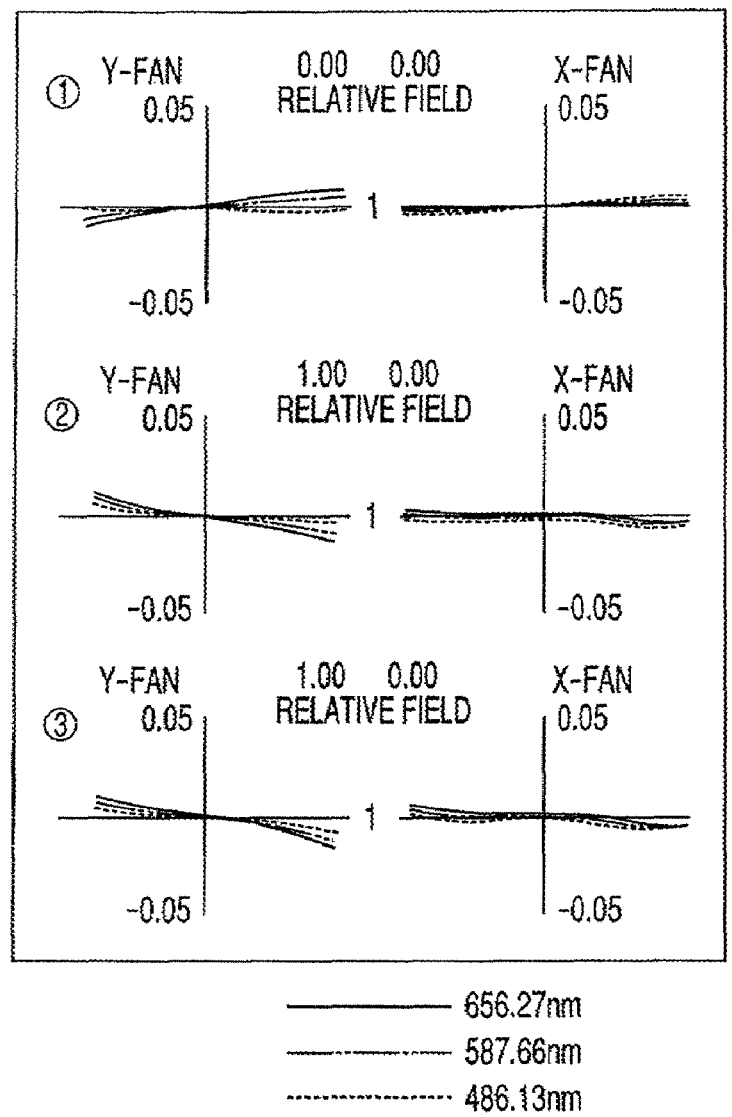
FIGS. 12A and 12B are explanatory diagrams showing imaging performance of the scanning optical system on a surface to be scanned in Embodiment 1 of the present invention.
Figure 12B:
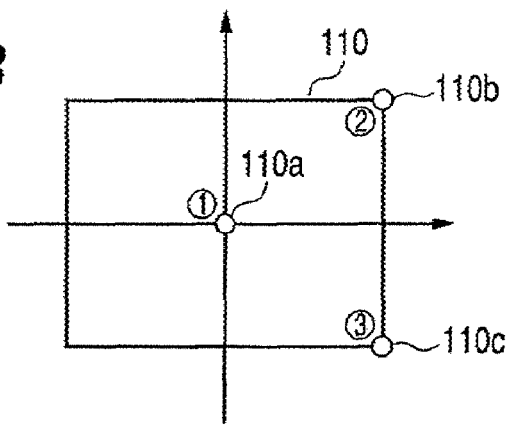

Image distortion such as unevenness due to a change in scanning speed which is caused by a resonant device is electrically corrected by an image distortion correcting circuit. Even in the following embodiments, the image distortion is electrically corrected. FIGS. 12A and 12B show imaging characteristics at points 110a, 110b, and 110c on the surface to be scanned 110 in Embodiment 1.

Embodiment 2

Figure 6:
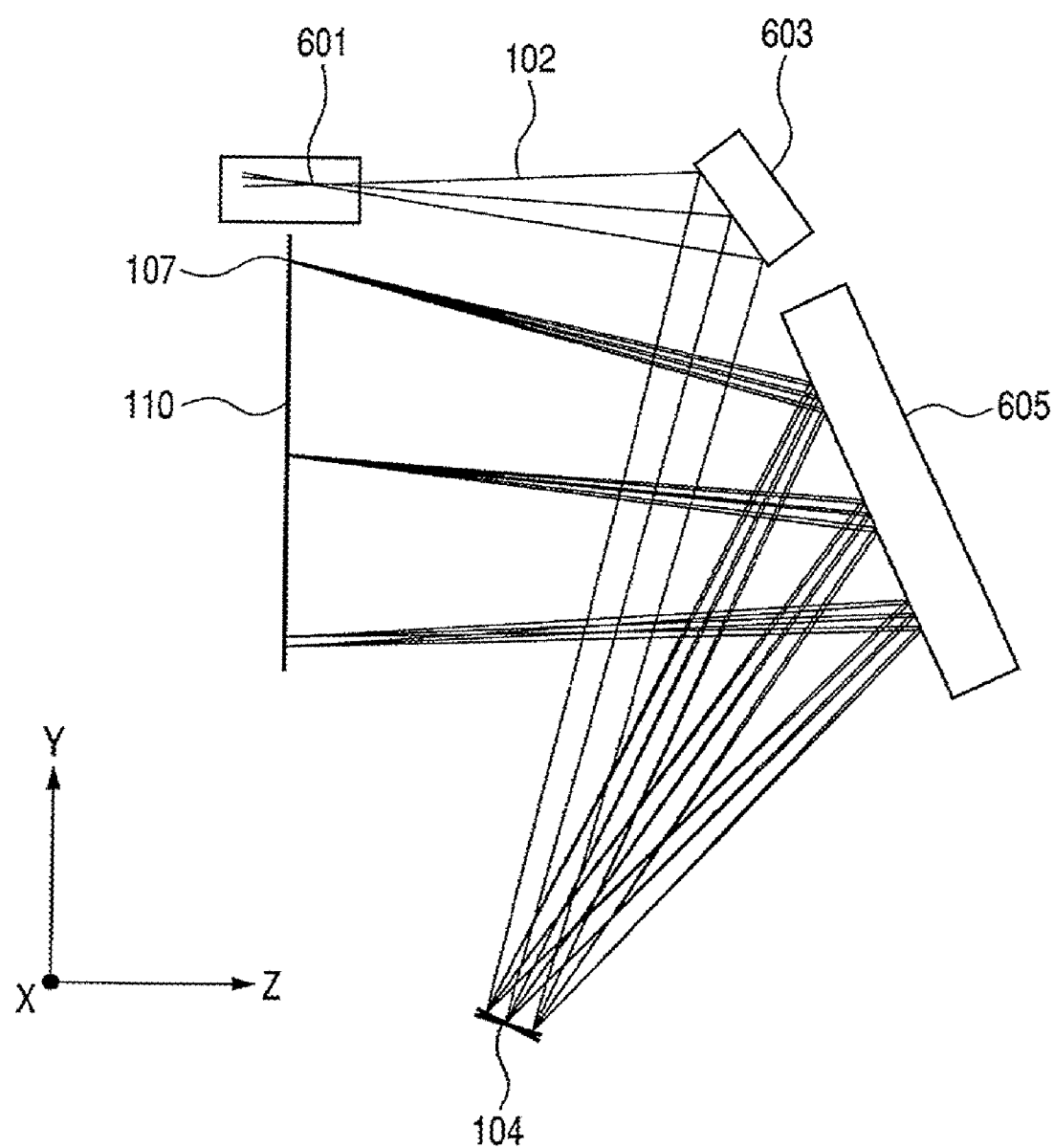
FIG. 6 is an optical sectional diagram showing a scanning optical system in Embodiment 2 of the present invention.

FIG. 6 is a schematic diagram of essential elements in Embodiment 2 of the present invention. In each of Embodiment 2 and Embodiment 3 described later, a structure including only the scanning optical system and the vicinity thereof is shown and the ocular optical system is omitted. In Embodiment 2 and the subsequent embodiments following it, members provided with the same reference symbols as those in Embodiment 1 have the same effects.

FIG. 6 shows a vertical section of a scanning image display apparatus according to Embodiment 2 of the present invention. In FIG. 6, a light source 601 emits a light beam which is directly modulated based on an input signal of a display image which is not shown. The light beam 102 emerged from the light source 601 is converted into a light beam having a predetermined shape (beam diameter is adjusted) by an optical system 603 and then incident on the scanning member 104. The light beam incident on the scanning member 104 is two-dimensionally scanned by the scanning member 104 and becomes incident on a scanning optical system 605 including a surface reflective mirror having a positive power. The light beam incident on the scanning optical system 605 is imaged onto the surface to be scanned 110 or the vicinity thereof to form the spot 107. The surface to be scanned 110 is scanned with the light beam 102 by the scanning member 104. At this time, the spot 107 two-dimensionally moves on the surface to be scanned 110 and the light beam 102 from the light source 601 is modulated in accordance with the movement of the spot. Therefore, the surface to be scanned 110 is two-dimensionally scanned to form an image on the surface to be scanned 110. In Embodiment 2, the field lens 106 used in Embodiment 1 is not disposed and the spot is directly imaged onto the surface to be scanned 110. Note that the field lens may be inserted between the surface to be scanned 110 and the ocular optical system. A Fresnel lens instead of the field lens may be located on the surface to be scanned 110 or in the vicinity thereof to change only the orientation of the ray.

Figure 7:
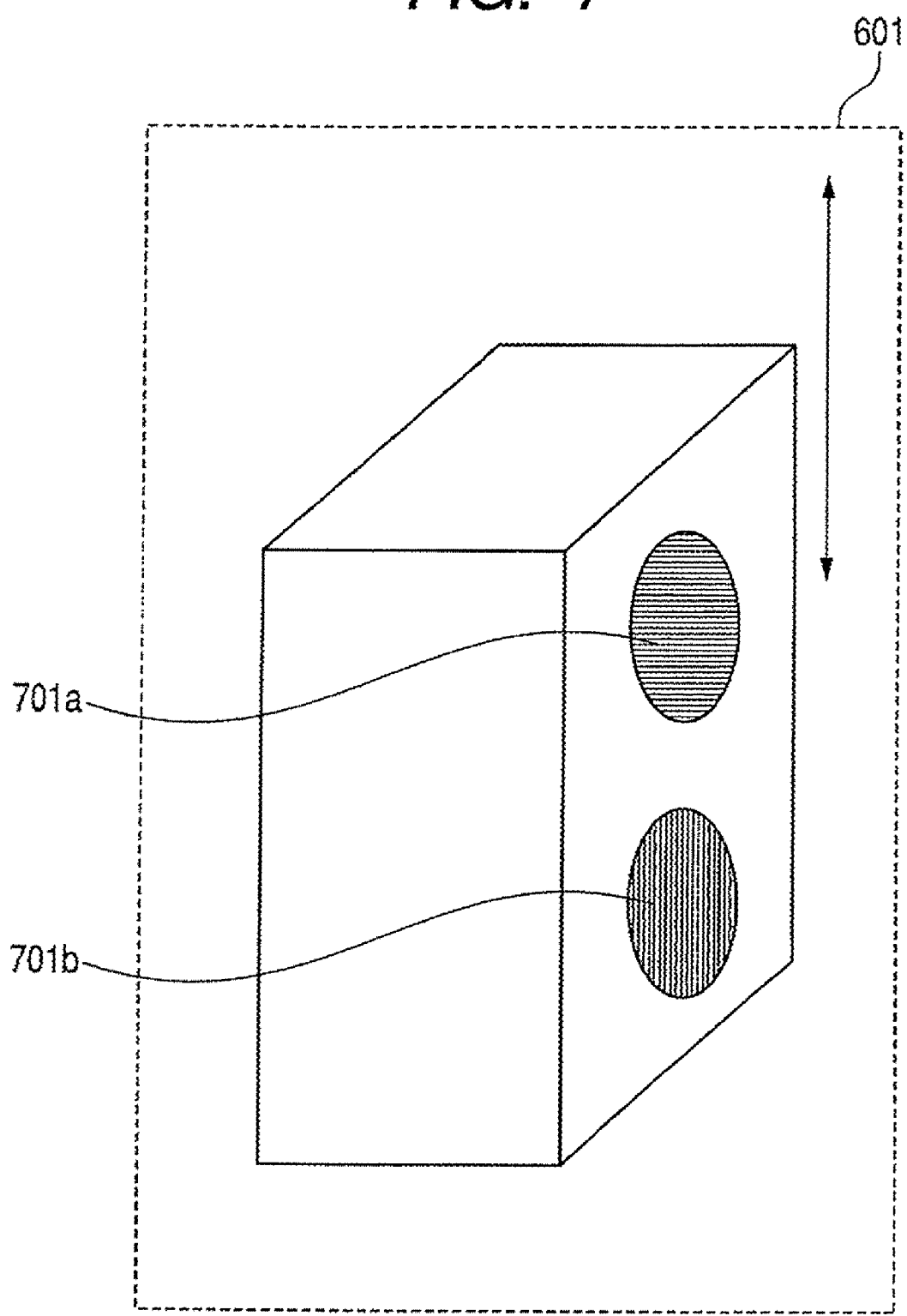
FIG. 7 is a schematic view showing a light source in Embodiment 2 of the present invention.
Figure 8:
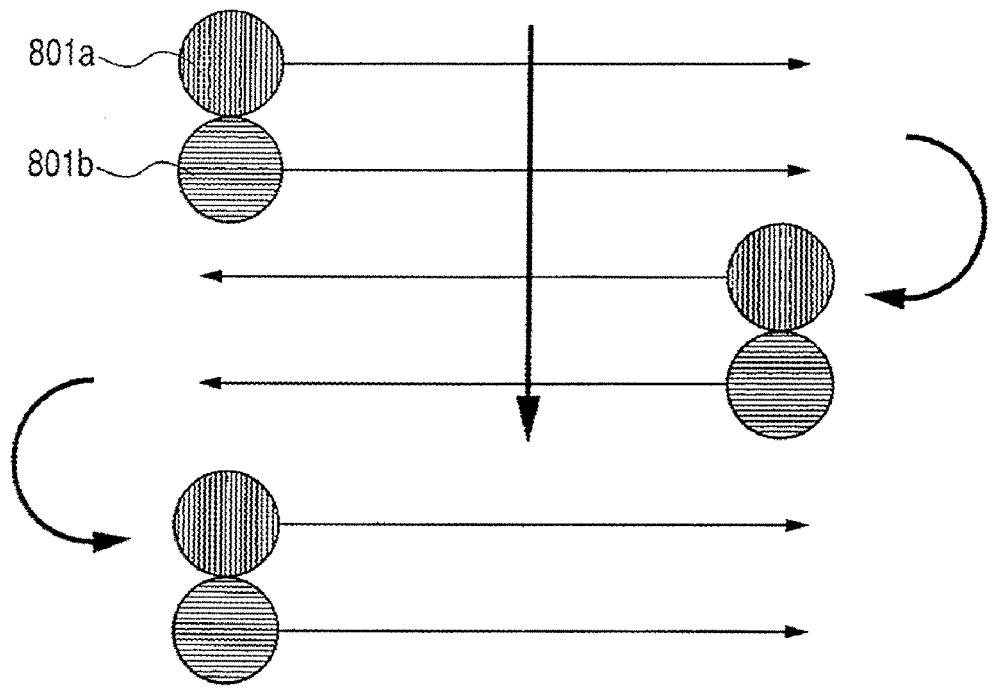
FIG. 8 is an explanatory view related to image generation in Embodiment 2 of the present invention.

In Embodiment 2, a configuration of the light source 601 is different from that in Embodiment 1. FIG. 7 shows the configuration of the light source 601 in Embodiment 2 and FIG. 8 shows a drawing method using the light source 601 in Embodiment 2. As shown in FIG. 7, the light source 601 includes two light emitting points 701a and 701b arranged in a direction along the vertical section (YZ-plane) shown in FIG. 6. A distance between the two light emitting points 701a and 701b is a distance between images 801a and 801b of the light emitting points 701a and 701b which are formed on the surface to be scanned 110 and precisely corresponds to one pixel. With such a state, when the light beam is scanned in the vertical and horizontal directions by the scanning member 104 as shown in FIG. 8, the images 801a and 801b are scanned on the surface to be scanned 110. Here, the images simultaneously move on two lines, thereby performing simultaneous drawing on the two lines.

Figure 9:
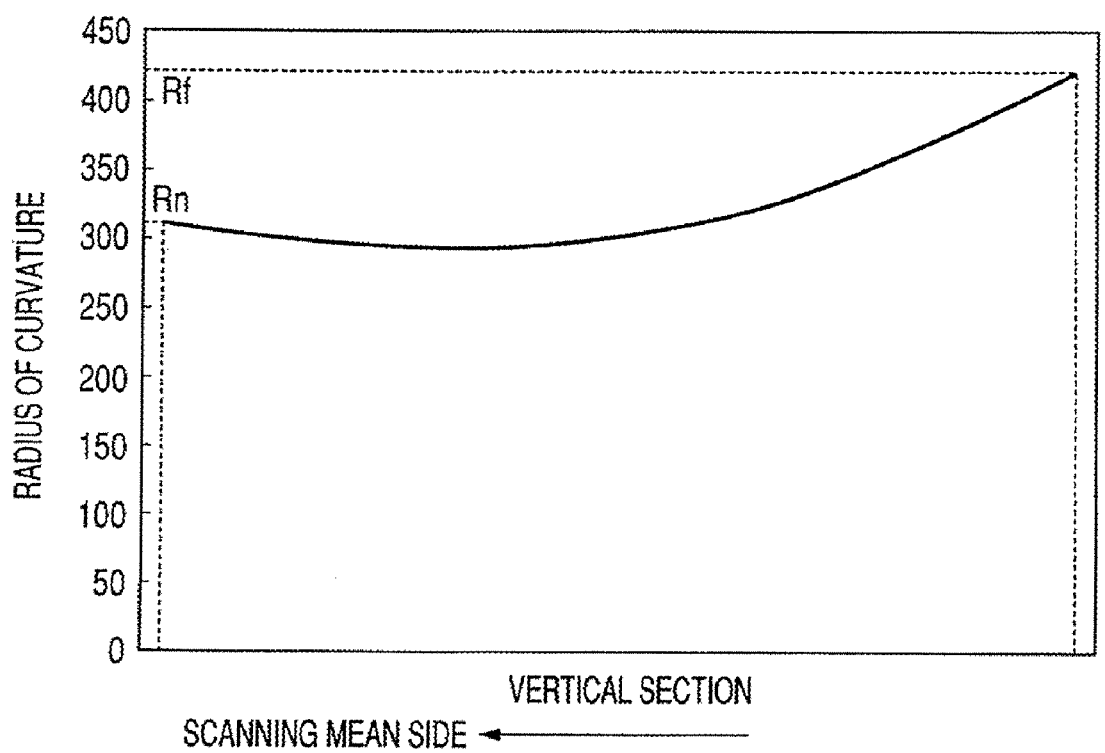
FIG. 9 is an explanatory graph showing a radius of local curvature on a vertical section of a scanning optical system in Embodiment 2 of the present invention.

FIG. 9 shows a change in radius of local curvature within the vertical section of the scanning optical system 605, the section including the center light beam traveling on the optical path from the scanning member 104 to the surface to be scanned 110 in Embodiment 2. In FIG. 9, the ordinate indicates a radius of curvature and the abscissa indicates a position in a sectional direction. In the abscissa direction, a position becomes closer to the scanning member 104 as it is shifted to the left. In addition, the position becomes farther from the scanning member 104 as it is shifted to the right. As shown in FIG. 9, the radius of curvature Rf on the side farthest from the scanning member 105 is larger than the radius of curvature Rn on the side closest to the scanning member 105.

Figure 13A:
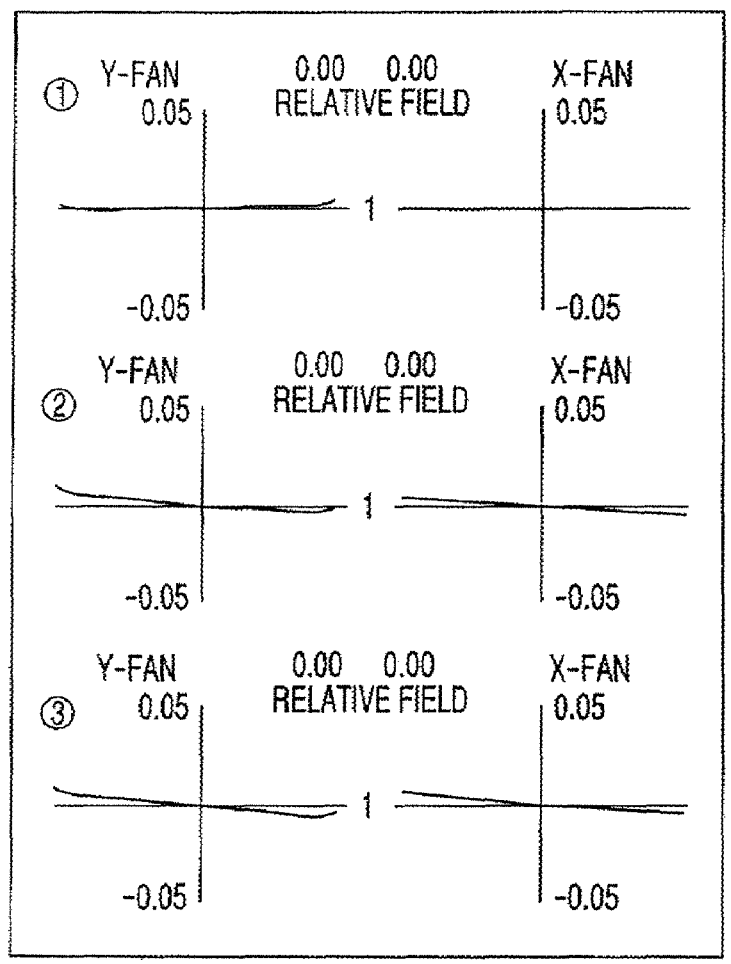
FIGS. 13A and 13B are explanatory diagrams showing imaging performance of the scanning optical system on the surface to be scanned in Embodiment 2 of the present invention.
Figure 13B:
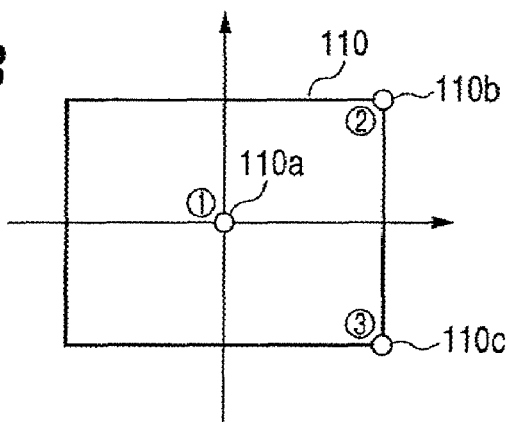

FIGS. 13A and 13B show imaging characteristics at the points 110a, 110b, and 110c on the surface to be scanned 110 in Embodiment 2.

Embodiment 3

Figure 10:
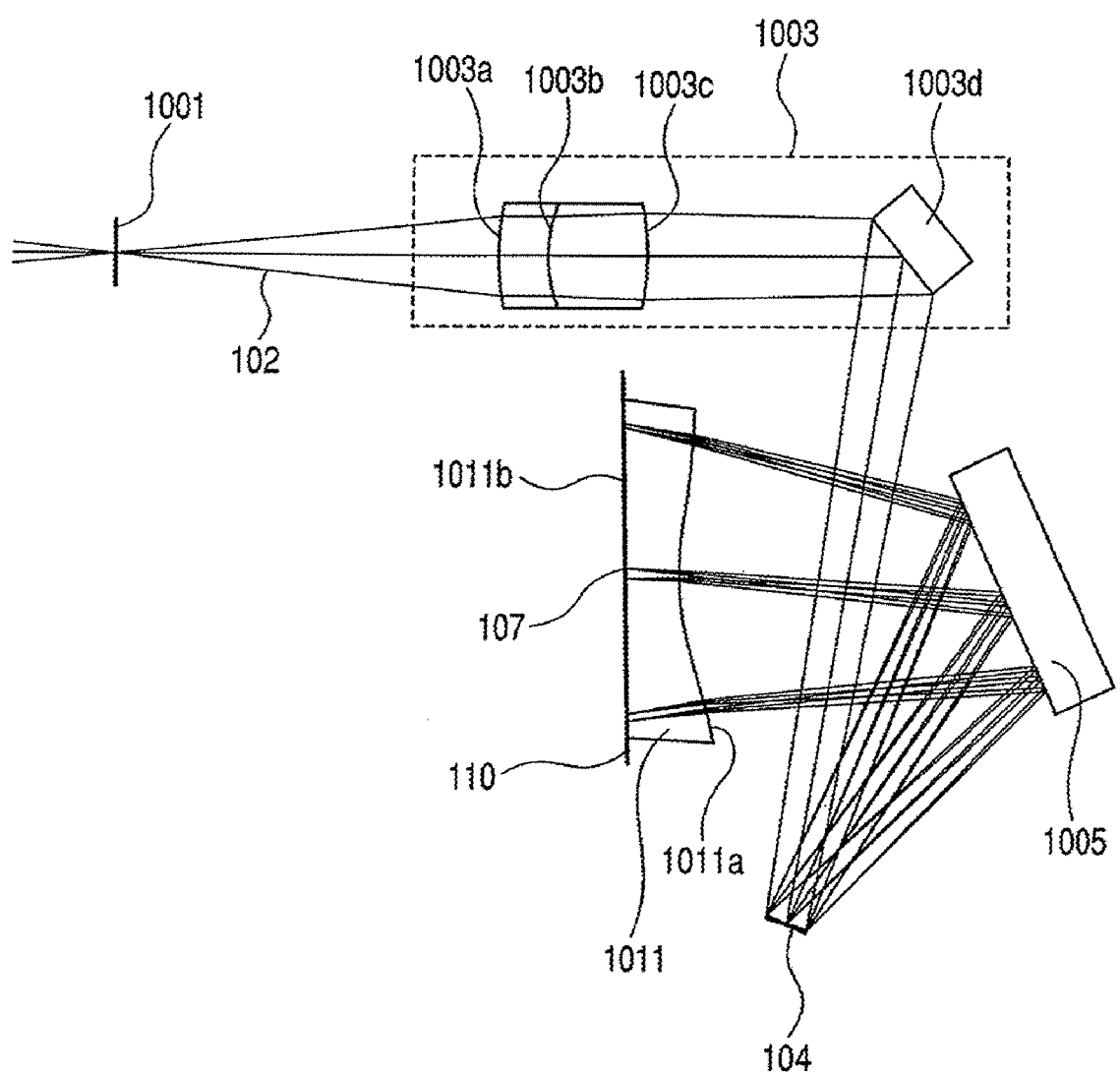
FIG. 10 is an optical sectional diagram showing a scanning optical system in Embodiment 3 of the present invention.

FIG. 10 is a schematic diagram of essential elements in Embodiment 3 of the present invention. FIG. 10 shows a vertical section of an optical system in Embodiment 3 of the present invention.

In FIG. 10, a light source 1001 emits a light beam which is directly modulated based on an input signal of a display image which is not shown. The light beam 102 emerged from the light source 1001 is converted into a light beam having a predetermined shape (beam diameter is adjusted) by an optical system 1003 and becomes incident on the scanning member 104. The light beam incident on the scanning member 104 is two-dimensionally scanned by the scanning member 104 and becomes incident on a scanning optical system 1005 including a surface reflective mirror having a positive power. The light beam incident on the scanning optical system 1005 passes through a correction lens 1011 and then is imaged onto the surface to be scanned 110 or the vicinity thereof to form the spot 107. The surface to be scanned 110 is scanned with the light beam 102 by the scanning member 104. At this time, the spot 107 two-dimensionally moves on the surface to be scanned 110 and the light beam 102 from the light source 1001 is modulated in accordance with the movement of the spot, thereby forming a two-dimensional image on the surface to be scanned 110.

In Embodiment 3, only a single light emitting point is shown as a light source. However, the light source is not limited to a light source for emitting a monochromatic beam. Beams from a light source for separately emitting a red beam, a green beam, and a blue beam may be combined by a color combining means and modulated corresponding to video signals based on the respective color beams, thereby forming a color image.

Figure 11:
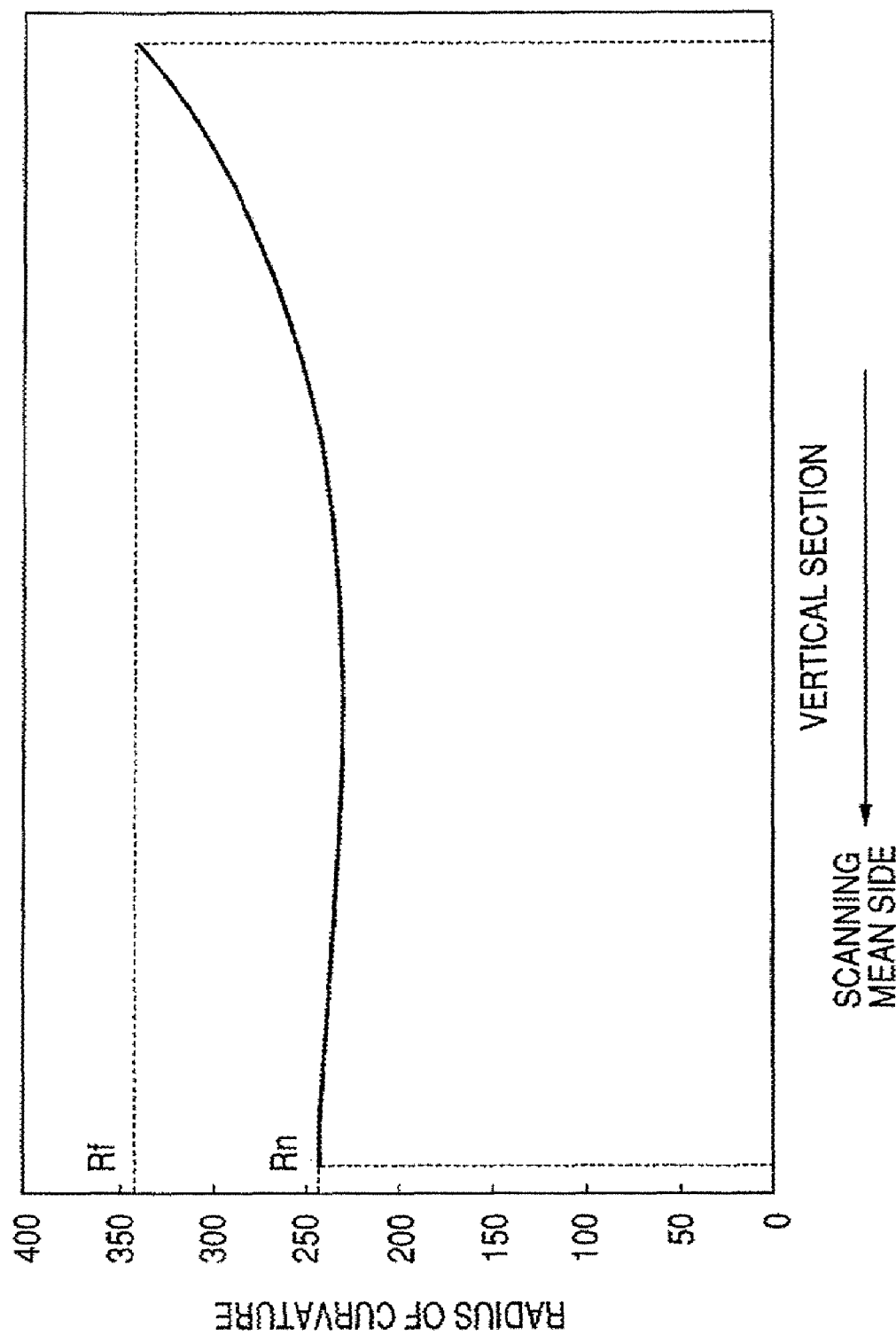
FIG. 11 is an explanatory graph showing a radius of local curvature on a vertical section of a scanning optical system in Embodiment 3 of the present invention.

FIG. 11 shows a change in radius of local curvature within the vertical section of the scanning optical system 105, the section including the center light beam traveling on the optical path from the scanning member 104 to the surface to be scanned 110 in Embodiment 3. In FIG. 11, the ordinate indicates a radius of curvature and the abscissa indicates a position in a sectional direction. In the abscissa direction, a position becomes closer to the scanning member 104 as it is shifted to the left. In addition, the position becomes farther from the scanning member 104 as it is shifted to the right. As shown in FIG. 11, the radius of curvature Rf on the side farther from the scanning member 105 is larger than the radius of curvature Rn on the side closer to the scanning member 105.

The correction lens 1011 includes a surface 1011a located on the scanning optical system 1005 side and a surface 1011b located on the side of the surface to be scanned 110. The surface 1011a has a rotationally asymmetric shape and the surface 1011b has a flat shape. The correction lens 1011 is located to correct aberration which cannot be corrected by the scanning optical system 1005.

Figure 14A:
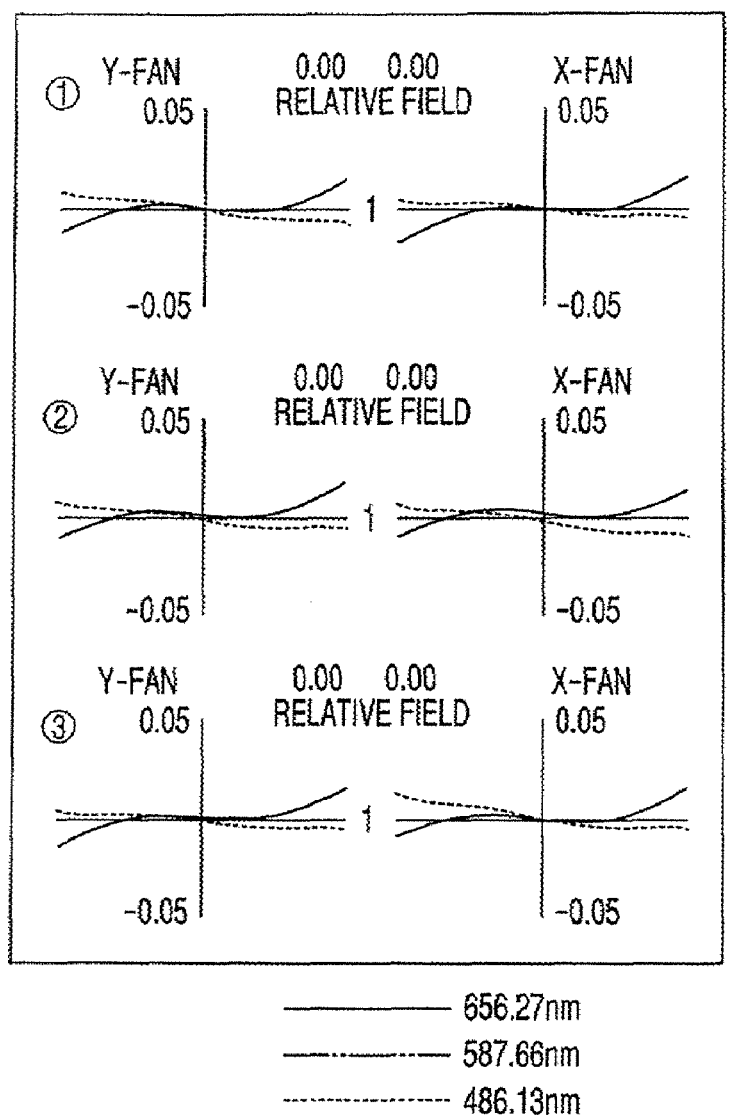
FIGS. 14A and 14B are explanatory diagrams showing imaging performance of the scanning optical system on the surface to be scanned in Embodiment 3 of the present invention.
Figure 14B:
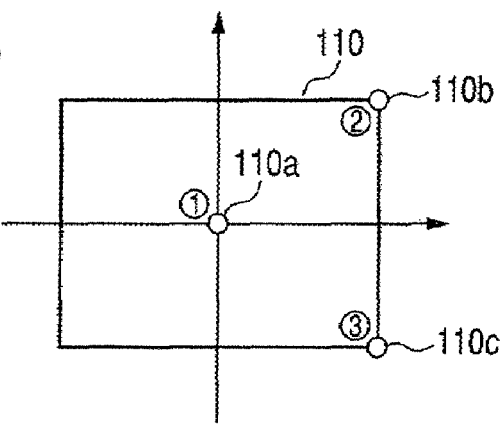

FIGS. 14A and 14B show imaging characteristics at the points 110a, 110b, and 110c on the surface to be scanned 110 in Embodiment 3.

Embodiment 4

Figure 15:
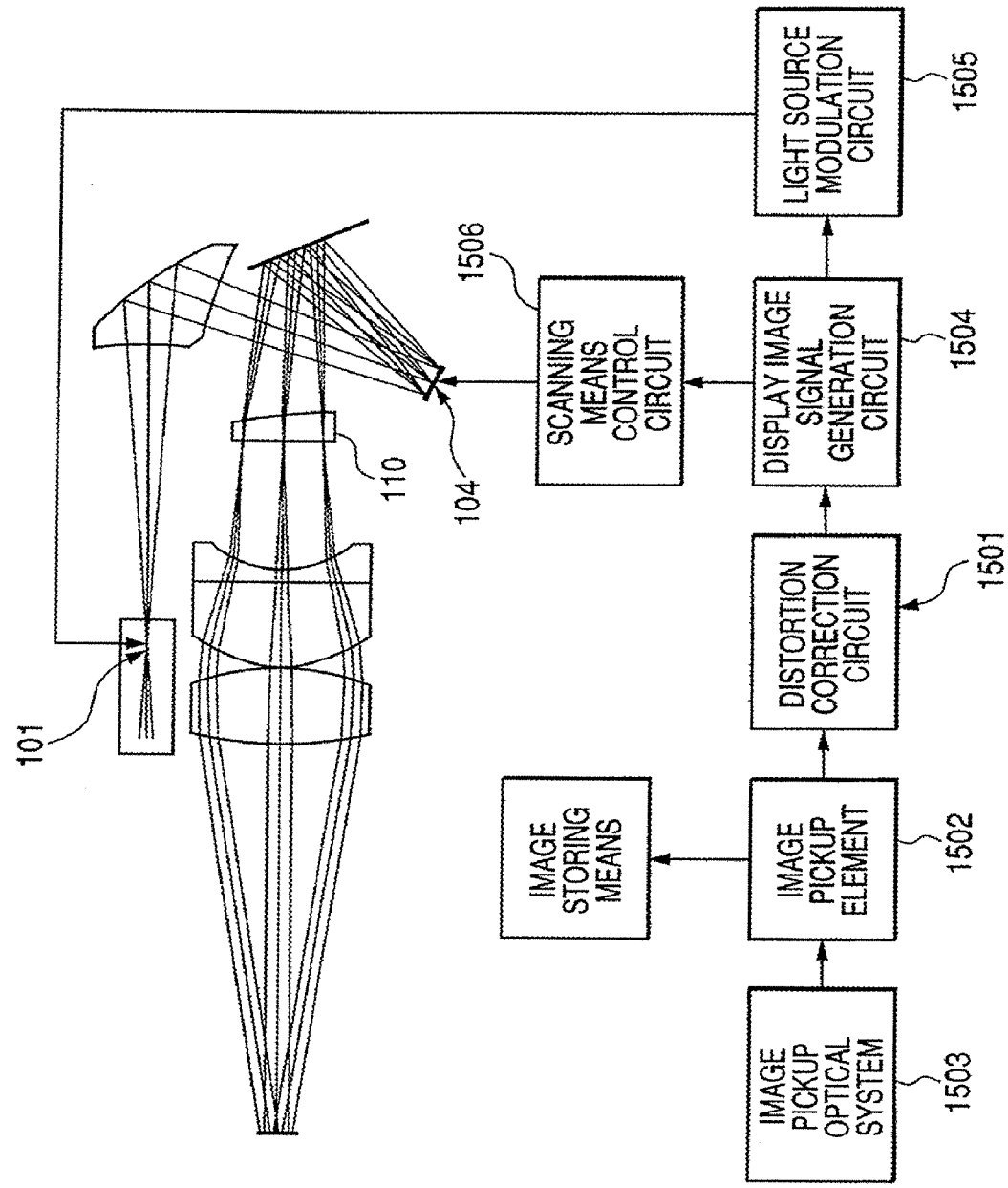
FIG. 15 is an explanatory diagram showing a structure of an electronic view finer using a scanning image display apparatus according to Embodiment 4 of the present invention.

FIG. 15 is a structural diagram showing an electric view finder using a scanning image display apparatus according to Embodiment 4 of the present invention. In FIG. 15, an optical system of the image display apparatus has the same structure as that in Embodiment 1.

An image formed by an image pickup optical system 1503 is converted into an electrical signal by an image pickup element 1502 capable of converting an image (beam) into an electrical signal, such as a charge coupled device (CCD). When the electrical signal distorted by the scanning image display apparatus is to be corrected by a distortion correction circuit 1501, an optical modulation timing of the light source 101 and the scanning member 104 are controlled through a display image signal generation circuit 1504 and a light source modulation circuit 1505. Therefore, a high-quality image having no distortion is formed on the surface to be scanned 110.

Figure 16:
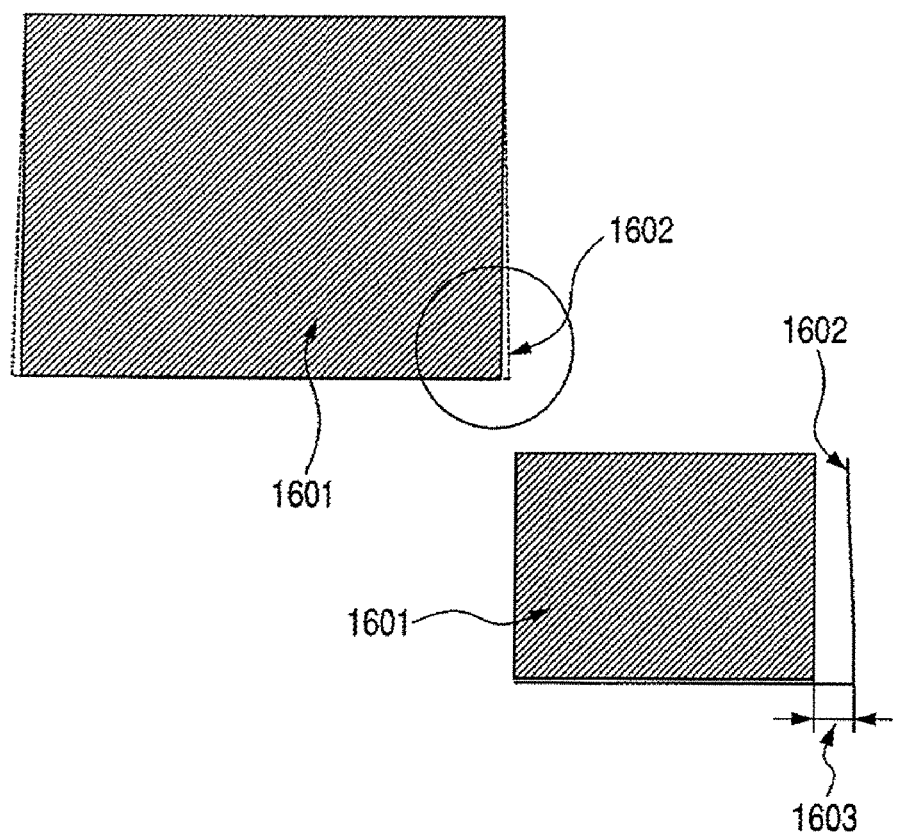
FIG. 16 is an explanatory view showing an effect of a distortion correction circuit in Embodiment 4 of the present invention.

The distortion correction circuit 1501 will be described below in detail. FIG. 16 shows a state in which a distorted image is corrected to a rectangular image by the distortion correction circuit 1501. The light beam 102 scanned by the scanning member 104 passes through the scanning optical system 105 and scans an area indicated by reference numeral 1602 on the surface to be scanned 110. However, the area 1602 to be scanned becomes not a complete rectangle but a distorted trapezoid as shown in FIG. 16. Then, when an image is displayed without any processing, an observer observes a distorted image, thereby reducing the quality of the displayed image. Therefore, signals inputted to a scanning member control circuit 1506 and the light source modulation circuit 1505 are processed by the distortion correction circuit 1501 to shift a light emission timing of the light source 101 by a time corresponding to a distance indicated by reference numeral 1603 in advance, with the result that the image observed by the observer becomes a rectangular image as indicated by the area 1601. In order to correct the light emission timing, a method of optically simulating observed distortion and constructing correction data based on a result obtained by the simulation can be used. As disclosed in Japanese Patent Application Laid-open No. H10-301052, distortion in an actual optical system may be measured and correction may be performed by calculating the amount of distortion based on measured data.

In each of Embodiments 1 to 4 described above, it is expected to generate a two-dimensional image having an aspect ratio of 4:3. However, each of the embodiments is not limited to such an image. For example, an image having an aspect ratio of 16:9 may be generated.

Numerical Embodiments

Hereinafter, Numerical Embodiments corresponding to Embodiments 1 to 3 will be described.

Tables 1 to 3 show respective numerical embodiments. In the descriptions, a light source position is set as a reference of an absolute coordinate system. Note that Tables 1 to 3 correspond to Embodiments 1 to 3, respectively.

Assume that three-dimensional coordinate axes in an absolute coordinate system are a Z-axis, a Y-axis, and an X-axis as defined below.

Z-axis: a straight line passing from a center of a zeroth surface to a center of a first surface (absolute coordinate system origin) in which a direction is set in a positive direction Y-axis: a straight line which passes through the first surface (absolute coordinate system origin) and is rotated counterclockwise about the Z-axis by 90 degrees X-axis: a straight line which passes through an origin and is perpendicular to the Z-axis and the Y-axis A surface shape of an i-th surface which is a part of an optical system is expressed by a function based on a local coordinate system which is provided in advance. A tilt angle of the i-th surface within the YZ-plane is expressed by an angle $\theta g_i$ (degrees in unit) in a case where a counterclockwise direction about the Z-axis of the absolute coordinate system is set as a positive direction. In the numerical embodiments, the tilt angle is set only within the YZ-plane. In The local coordinate system (x, y, z), y- and z-axes of the i-th surface are within the YZ-plane of the absolute coordinate system and tilted at the angle θgi within the YZ-plane.

z-axis: a straight line which passes through an origin of the local coordinate system and is rotated counterclockwise about the Z-axis of the absolute coordinate system within the YZ-plane by θi.

y-axis: a straight line which passes through the origin of the local coordinate system and is rotated counterclockwise about a Z-direction within the YZ-plane by 90 degrees x-axis: a straight line which passes through the origin of the local coordinate system and is perpendicular to the YZ-plane Reference Numeral Ndi denotes a refractive index based on a d-line between the i-th surface and a (i+1)-th surface and σdi denotes an Abbe number based on the d-line therebetween.

Hereinafter, a surface shape with no rotationally symmetric axis which is used in the present invention is expressed by the following expression. In the numerical embodiments, rotationally asymmetric surfaces are expressed by SPS and XYP in tables.

$$z = \frac{cr^2}{1+\sqrt{1-(1+k)c^2r^2}} + c2x + c3y + c4x^2 + c5xy + c6y^2 +$$
$$c7x^3 + c8x^2y + c9xy^2 + c10y^3 + c11x^4 + c12x^3y +$$
$$c13x^2y^2 + c14xy^3 + c15y^4 + c16x^5 + c17x^4y + c18x^3y^2 +$$
$$c19x^2y^3 + c20xy^4 + c21y^5 + c22x^6 + c23x^5y + c24x^4y^2 +$$
$$c25x^3y^3 + c26x^2y^4 + c27xy^5 + c28y^6 + c29x^7 +$$
$$c30x^6y + c31x^5y^2 + c32x^4y^3 + c33x^3y^4 + c34x^2y^5 +$$
$$c35xy^6 + c36y^7 + c37x^8 + c38x^7y + c39x^6y^2 + c40x^5y^3 +$$
$$c41x^4y^4 + c42x^3y^5 + c43x^2y^6 + c44xy^7 + c45y^8$$

Formula 1

This function is a function for defining the surface shape based on the local coordinate system (x, y, z) of the i-th surface.

When a term related to an odd order of x in the local coordinate system is set to 0 in the above-mentioned function, a surface symmetric with respect to a yz-plane can be obtained. In the numerical embodiments, Tables 1 to 3 show radii of curvature in the local coordinate origin of each optical surface (radius of curvature on local meridional line section and radius of curvature on sagittal line section) rx and ry, the amount of decentrations "shift" and "tilt", a refractive index nd, and an Abbe number σd.

A surface whose shape is freely curved is expressed by XYP and a surface whose shape is aspherical is expressed by ASP. Respective coefficients are indicated in a lower side of each table. Reference numeral M expresses that the surface is a reflective surface.

Numerical Embodiment 1

The scanning member corresponds to a seventh surface (indicated by 104 in Embodiment 1). A deflection angle in a horizontal direction (paper surface is set as an axis and oscillation is performed in a vertical direction of the paper surface) is ±2.20 degrees and a deflection angle in a vertical direction (vertical direction of the paper surface is set as an axis and oscillation is performed within the paper surface) is ±3.30 degrees. The number of light emitting points is two. The light emitting points are located in positions of x=1.33 and −1.33. A numerical aperture is 0.07.

Correspondences to reference symbols in FIG. 1 are as follows.

| | |
|---|---|
| Light Source 101 | Surface Number 1 |
| Surface 103a | Surface Number 2 |
| Surface 103b | Surface Number 3 |
| Surface 103c | Surface Number 4 |
| Scanning Member 104 | Surface Number 7 |
| Scanning Optical System 105 | Surface Number 10 |
| Field Lens 106a | Surface Number 12 |
| Field Lens 106b | Surface Number 13 |
| Surface to be scanned 110 | Surface Number 13 |
| Surface 108a | Surface Number 14 |
| Surface 108b | Surface Number 15 |
| Surface 108c | Surface Number 16 |
| Surface 108d | Surface Number 17 |
| Surface 108e | Surface Number 18 |
| Pupil | Surface Number 20 |

Formula 2

| type | sur | Yg | Zg | θg | ry | rx | shift | tilt | nd | vd |
|---|---|---|---|---|---|---|---|---|---|---|
| | 1 | 0.0000 | 0.0000 | 0.0000 | 0.0000 | 0.0000 | 0.000 | 0.000 | 1.000 | |
| XYP | 2 | −1.8525 | 23.1900 | −2.8346 | 0.0000 | 0.0000 | −1.853 | −2.835 | 1.535 | 41.70 |
| XYP-M | 3 | −0.0461 | 27.9446 | −34.9798 | 0.0000 | 0.0000 | −0.046 | 34.980 | −1.535 | 41.70 |
| XYP | 4 | 6.2801 | 29.30793 | −65.3823 | 0.0000 | 0.0000 | 6.280 | −65.382 | −1.000 | |
| | 5 | 22.4117 | 19.9620 | −70.0005 | 0.0000 | 0.0000 | 22.412 | −70.000 | −1.000 | |
| | 6 | 22.4117 | 19.9620 | −58.0005 | 0.0000 | 0.0000 | 22.412 | −58.000 | −1.000 | |
| M | 7 | 22.4117 | 19.96196 | −58.0005 | 0.0000 | 0.0000 | 22.412 | −58.000 | 1.000 | |
| | 8 | 22.4117 | 19.9620 | −58.0005 | 0.0000 | 0.0000 | 22.412 | −58.000 | 1.000 | |
| | 9 | 22.4117 | 19.9620 | −46.0005 | 0.0000 | 0.0000 | 22.412 | −46.000 | 1.000 | |
| XYP-M | 10 | 21.1893 | 33.77164 | −19.0116 | 0.0000 | 0.0000 | 21.189 | −19.012 | −1.000 | |
| | 11 | 10.7497 | 17.9122 | 0.7199 | 0.0000 | 0.0000 | 10.750 | 0.720 | −1.000 | |
| | 12 | 14.9652 | 17.8592 | 0.7199 | −43.4557 | −43.4557 | 14.965 | 0.720 | −1.520 | 48.19 |
| | 13 | 10.7222 | 15.7300 | 0.7199 | 0.0000 | 0.0000 | 10.722 | 0.720 | −1.000 | |
| | 14 | 10.5981 | 5.8489 | 0.7199 | 9.4553 | 9.4553 | 10.598 | 0.720 | −1.864 | 17.40 |
| | 15 | 10.5855 | 4.8489 | 0.7199 | −1551.6948 | −1551.6948 | 10.586 | 0.720 | −1.703 | 41.61 |
| | 16 | 10.5038 | −1.6505 | 0.7199 | 11.7503 | 11.7503 | 10.504 | 0.720 | −1.000 | |

-continued

Formula 2

| type | sur | Yg | Zg | θg | ry | rx | shift | tilt | nd | vd |
|---|---|---|---|---|---|---|---|---|---|---|
| ASP | 17 | 10.5013 | −1.8505 | 0.7199 | −19.5309 | −19.5309 | 10.501 | 0.720 | −1.535 | 41.70 |
|  | 18 | 10.4291 | −7.6001 | 0.7199 | 35.1237 | 35.1237 | 10.429 | 0.720 | −1.000 |  |
|  | 19 | 10.4291 | −7.6001 | 0.7199 | 0.0000 | 0.0000 | 10.429 | 0.720 | −1.000 |  |
|  | 20 | 10.0521 | −37.5977 | 0.7199 | 0.0000 | 0.0000 | 10.052 | 0.720 | −1.000 |  |

Formula 3 surface no. = 2

| | | | | | |
|---|---|---|---|---|---|
| XYP | rdy = 1.000e+018 | c3 = 0.000e+000 | c4 = −4.285e−002 | c6 = −1.267e−002 | c8 = 0.000e+000 |
|  | c10 = 0.000e+000 | c11 = −2.948e−004 | c13 = 1.904e−003 | c15 = −3.817e−004 | c17 = 0.000e+000 |
|  | c19 = 0.000e+000 | c21 = 0.000e+000 | c22 = −8.540e−007 | c24 = 3.298e−006 | c26 = 2.279e−005 |
|  | c28 = 9.025e−006 | c30 = 0.000e+000 | c32 = 0.000e+000 | c34 = 0.000e+000 | c36 = 0.000e+000 |
|  | c37 = 0.000e+000 | c39 = 0.000e+000 | c41 = 0.000e+000 | c43 = 0.000e+000 | c45 = 0.000e+000 | surface no. = 3

| | | | | | |
|---|---|---|---|---|---|
| XYP | rdy = 1.000e+018 | c3 = 3.029e−003 | c4 = −1.606e−002 | c6 = −1.196e−002 | c8 = −1.395e−004 |
|  | c10 = 7.844e−005 | c11 = −2.790e−005 | c13 = 1.150e−004 | c15 = 6.602e−006 | c17 = 1.130e−007 |
|  | c19 = −6.306e−006 | c21 = 1.999e−006 | c22 = 1.674e−007 | c24 = −5.082e−007 | c26 = 3.057e−007 |
|  | c28 = −7.571e−008 | c30 = −4.378e−009 | c32 = 6.154e−008 | c34 = 3.595e−008 | c36 = 7.307e−009 |
|  | c37 = 0.000e+000 | c39 = 0.000e+000 | c41 = 0.000e+000 | c43 = 0.000e+000 | c45 = 0.000e+000 | surface no. = 4

| | | | | | |
|---|---|---|---|---|---|
| XYP | rdy = 1.000e+018 | c3 = 0.000e+000 | c4 = −8.877e−003 | c6 = −9.195e−003 | c8 = 0.000e+000 |
|  | c10 = 0.000e+000 | c11 = −1.552e−004 | c13 = 1.189e−003 | c15 = −1.853e−004 | c17 = 0.000e+000 |
|  | c19 = 0.000e+000 | c21 = 0.000e+000 | c22 = 9.287e−007 | c24 = −2.975e−006 | c26 = −4.666e−006 |
|  | c28 = 5.150e−007 | c30 = 0.000e+000 | c32 = 0.000e+000 | c34 = 0.000e+000 | c36 = 0.000e+000 |
|  | c37 = 0.000e+000 | c39 = 0.000e+000 | c41 = 0.000e+000 | c43 = 0.000e+000 | c45 = 0.000e+000 | surface no. = 10

| | | | | | |
|---|---|---|---|---|---|
| XYP | rdy = 1.000e+018 | c3 = −4.393e−002 | c4 = 2.560e−003 | c6 = −1.003e−002 | c8 = 1.254e−003 |
|  | c10 = −6.318e−004 | c11 = 5.471e−052 | c13 = 1.094e−051 | c15 = 5.471e−052 | c17 = 3.017e−005 |
|  | c19 = −3.344e−005 | c21 = 1.831e−006 | c22 = 1.380e−005 | c24 = 6.664e−006 | c26 = −4.570e−006 |
|  | c28 = −5.827e−008 | c30 = 2.547e−006 | c32 = 3.958e−007 | c34 = −2.480e−007 | c36 = −1.272e−008 |
|  | c37 = −5.910e−008 | c39 = 1.249e−007 | c41 = 4.409e−009 | c43 = −4.798e−009 | c45 = −3.700e−010 |

Formula 4 surface no. = 12

SPH    rdy = −4.346e+001 surface no. = 13

SPH    rdy = 1.000e+018 surface no. = 14

SPH    rdy = 9.455e+000 surface no. = 15

SPH    rdy = −1.552e+003 surface no. = 16

SPH    rdy = 1.175e+001 surface no. = 17

| | | | | | | |
|---|---|---|---|---|---|---|
| ASP | rdy = −1.953e+001 | a = −2.689e−004 | b = 4.501e−006 | c = −4.965e−008 | d = 2.930e−010 | e = −6.640e−013 | surface no. = 18

SPH    rdy = 9.512e+001

FIG. 12A is a diagram showing lateral aberration corresponding to each position on the surface to be scanned 110 shown in FIG. 12B in Embodiment 1. Wavelengths in this lateral aberration diagram are 656.27 nm, 587.56 nm, and 486.13 nm.

Numerical Embodiment 2

The scanning member corresponds to a fifth surface (indicated by 104 in Embodiment 2). A deflection angle in a horizontal direction (paper surface is set as an axis and oscillation is performed in a vertical direction of the paper surface) is ±6.16 degrees and a deflection angle in a vertical direction (vertical direction of the paper surface is set as an axis and oscillation is performed within the paper surface) is ±4.62 degrees. The number of light emitting points is two. The light emitting points are located in positions of y=0.0017 and −0.0017 mm. A numerical aperture is 0.10.

| | |
|---|---|
| Light Source 601 | Surface Number 1 |
| Optical System 103 | Surface Number 2 |
| Scanning Member 104 | Surface Number 5 |
| Scanning Optical System 605 | Surface Number 8 |
| Surface to be Scanned 110 | Surface Number 10 |

FIG. 13A is a diagram showing lateral aberration corresponding to each position on the surface to be scanned 110 shown in FIG. 12B in Embodiment 2. Wavelengths in this lateral aberration diagram are 656.27 nm, 587.56 nm, and 486.13 nm.

Numerical Embodiment 3

The scanning member corresponds to a eighth surface (indicated by 104 in Embodiment 3). A deflection angle in a horizontal direction (paper surface is set as an axis and oscillation is performed in a vertical direction of the paper surface) is ±7.50 degrees and a deflection angle in a vertical direction (vertical direction of the paper surface is set as an axis and oscillation is performed within the paper surface) is ±5.625 degrees. The number of light emitting points is one. A numerical aperture is 0.10.

| | |
|---|---|
| Light Source 1001 | Surface Number 1 |
| Surface 1003a | Surface Number 2 |
| Surface 1003b | Surface Number 3 |
| Surface 1003c | Surface Number 4 |
| Surface 1003d | Surface Number 5 |
| Scanning Member 104 | Surface Number 7 |
| Scanning Optical System 1005 | Surface Number 11 |

Formula 5

| type | sur | Yg | Zg | θg | ry | rx | shift | tilt | nd | vd |
|---|---|---|---|---|---|---|---|---|---|---|
| | 1 | 0.0000 | 0.0000 | 0.0000 | 0.0000 | 0.0000 | 0.000 | 0.000 | 1.000 | |
| XYP-M | 2 | 0.0000 | 10.00000 | 39.0000 | 0.0000 | 0.0000 | 0.000 | 39.000 | −1.000 | |
| | 3 | −19.5630 | 5.8418 | 78.0000 | 0.0000 | 0.0000 | −19.563 | 78.000 | −1.000 | |
| | 4 | −19.5630 | 5.8418 | 68.0000 | 0.0000 | 0.0000 | −19.563 | 68.000 | −1.000 | |
| M | 5 | −19.5630 | 5.84177 | 68.0000 | 0.0000 | 0.0000 | −19.563 | 68.000 | 1.000 | |
| | 6 | −19.5630 | 5.8418 | 68.0000 | 0.0000 | 0.0000 | −19.563 | 68.000 | 1.000 | |
| | 7 | −19.5630 | 5.8418 | 58.0000 | 0.0000 | 0.0000 | −19.563 | 58.000 | 1.000 | |
| XYP-M | 8 | −16.5136 | 18.72085 | 29.5431 | 0.0000 | 0.0000 | −16.514 | 29.543 | −1.000 | |
| | 9 | −6.3494 | −0.2503 | 3.1854 | 0.0000 | 0.0000 | −6.349 | 3.185 | −1.000 | |
| | 10 | −6.3550 | −0.3502 | 3.1854 | 0.0000 | 0.0000 | −6.355 | 3.185 | −1.000 | | surface no. = 2

XYP  $rdy = 1.000e+018$  $c3 = 0.000e+000$  $c4 = -3.848e-002$  $c6 = -2.324e-002$  $c8 = -1.011e-003$
$c10 = -5.744e-004$  $C11 = -4.134e-005$  $c13 = -7.226e-005$  $c15 = -3.437e-005$  $c17 = 1.089e-004$
$c19 = -1.407e-005$  $C21 = -1.828e-005$  $c22 = 3.705e-007$  $c24 = -1.147e-005$  $c26 = 3.548e-006$
$c28 = 2.449e-006$  $C30 = -8.259e-005$  $c32 = -4.359e-005$  $c34 = 2.813e-005$  $c36 = 6.026e-006$
$c37 = 0.000e+000$  $C39 = 0.000e+000$  $c41 = 0.000e+000$  $c43 = 0.000e+000$  $c45 = 0.000e+000$ surface no. = 8

XYP  $rdy = 1.000e+018$  $c3 = 6.118e-002$  $c4 = 4.124e-004$  $c6 = -1.799e-003$  $c8 = -6.205e-004$
$c10 = 4.394e-005$  $C11 = -1.490e-052$  $c13 = -2.979e-052$  $c15 = -1490e-052$  $c17 = -1.839e-005$
$c19 = 1.239e-005$  $C21 = -2.885e-007$  $c22 = 8.430e-006$  $c24 = 3.710e-006$  $c26 = -1.452e-006$
$c28 = -4.381e-009$  $C30 = -1.465e-006$  $c32 = -1.778e-007$  $c34 = 6.543e-008$  $c36 = 1.841e-009$
$c37 = -2.969e-008$  $C39 = 6.772e-008$  $c41 = 3.343e-010$  $c43 = -9.401e-010$  $c45 = -5.524e-011$ -continued

| | |
|---|---|
| Field Lens 1011a | Surface Number 12 |
| Field Lens 1011b | Surface Number 13 |
| Surface to be Scanned 110 | Surface Number 14 |

Formula 6

| type | sur | Yg | Zg | θg | ry | rx | shift | tilt | nd | vd |
|---|---|---|---|---|---|---|---|---|---|---|
| | 1 | 0.0000 | 0.0000 | 0.0000 | 0.0000 | 0.0000 | 0.000 | 0.000 | 1.000 | |
| | 2 | 0.0000 | 15.0000 | 0.0000 | 10.9514 | 10.9514 | 0.000 | 0.000 | 1.709 | 22.07 |
| | 3 | 0.0000 | 17.0000 | 0.0000 | 5.0336 | 5.0336 | 0.000 | 0.000 | 1.520 | 48.14 |
| | 4 | 0.0000 | 21.0000 | 0.0000 | −10.2920 | −10.2920 | 0.000 | 0.000 | 1.000 | |
| M | 5 | 0.0000 | 31.00000 | 40.0000 | 0.0000 | 0.0000 | 0.000 | 40.000 | −1.000 | |
| | 6 | −25.6050 | 26.4851 | 80.0000 | 0.0000 | 0.0000 | −25.605 | 80.000 | −1.000 | |
| | 7 | −25.6050 | 26.4851 | 67.5000 | 0.0000 | 0.0000 | −25.605 | 67.500 | −1.000 | |
| M | 8 | −25.6050 | 26.48515 | 67.5000 | 0.0000 | 0.0000 | −25.605 | 67.500 | 1.000 | |
| | 9 | −25.6050 | 26.4851 | 67.5000 | 0.0000 | 0.0000 | −25.605 | 67.500 | 1.000 | |
| | 10 | −25.6050 | 26.4851 | 55.0000 | 0.0000 | 0.0000 | −25.605 | 55.000 | 1.000 | |
| XYP-M | 11 | −24.9573 | 40.26712 | 25.7495 | 0.0000 | 0.0000 | −24.957 | 25.750 | −1.000 | |
| XYP | 12 | −12.6666 | 22.3349 | 24.1459 | 0.0000 | 0.0000 | −12.667 | 24.146 | −1.534 | 41.65 |
| | 13 | −11.9712 | 20.1462 | 1.0128 | 0.0000 | 0.0000 | −11.971 | 1.013 | −1.000 | |
| | 14 | −11.9712 | 20.1462 | 1.0128 | 0.0000 | 0.0000 | −11.971 | 1.013 | −1.000 | | surface no. = 2

SPH    rdy = 1.095e+001 surface no. = 3

SPH    rdy = 5.034e+000 surface no. = 4

SPH    rdy = −1.029e+001 surface no. = 5

SPH    rdy = 1.000e+018

Formula 7 surface no. = 11

| | | | | | |
|---|---|---|---|---|---|
| XYP | rdy = 1.000e+018 | c3 = 7.542e−002 | c4 = 1.521e−003 | c6 = −3.680e−003 | c8 = −9.114e−004 |
| | c10 = 1.090e−004 | C11 = −1.490e−052 | c13 = −2.979e−052 | c15 = −1.490e−052 | c17 = −1.745e−005 |
| | c19 = 1.556e−005 | C21 = −1.648e−007 | c22 = 4.816e−006 | c24 = 3.021e−006 | c26 = −1.720e−006 |
| | c28 = −1.441e−008 | C30 = −7.056e−007 | c32 = −1.334e−007 | c34 = 7.455e−008 | c36 = 1.378e−009 |
| | c37 = −8.226e−009 | C39 = 2.693e−008 | c41 = 8.912e−010 | c43 = −1.122e−009 | c45 = −2.722e−011 | surface no. = 12

| | | | | | |
|---|---|---|---|---|---|
| XYP | rdy = 1.000e+018 | c3 = 3.964e−001 | c4 = 3.483e−002 | c6 = 5.738e−002 | c8 = 3.102e−003 |
| | c10 = 3.957e−004 | C11 = −2.727e−004 | c13 = −7.584e−005 | c15 = −1.085e−003 | c17 = −9.868e−005 |
| | c19 = 3.799e−005 | C21 = −6.953e−005 | c22 = 2.645e−007 | c24 = −3.380e−008 | c26 = 2.349e−007 |
| | c28 = 7.244e−006 | C30 = 5.935e−007 | c32 = 2.026e−007 | c34 = −8.056e−007 | c36 = 1.222e−006 |
| | c37 = 0.000e+000 | C39 = 0.000e+000 | c41 = 0.000e+000 | c43 = 0.000e+000 | c45 = 0.000e+000 | surface no. = 13

SPH    rdy = 1.000e+018

FIG. 14A is a diagram showing lateral aberration corresponding to each position on the surface to be scanned 110 shown in FIG. 14B in Embodiment 3. Wavelengths in this lateral aberration diagram are 656.27 nm, 587.56 nm, and 486.13 nm.

As described above, according to each of the embodiments, the following effects are obtained.

That is, the scanning optical system includes only one single reflective surface, so a size of a constituent element can easily be reduced. Chromatic aberration does not occur because of a use of the reflective surface. The scanning optical system has a positive power, so the curvature of field which is caused by the scanning member is easily corrected. The light beam from the optical system on which the light beam from the light source is incident is converted into a convergent light beam and made incident on the scanning optical system, so that the curvature of field is corrected in the scanning optical system. The optical system on which the light beam from the light source is incident has the necessary power for imaging, so a load on an optical system is reduced. When the optical power of the scanning optical system in a center of an image is negative, a stronger negative optical power is necessary for a circumference of the image. Therefore, aberration correction becomes more difficult as a position is shifted to the circumference of the image. In contrast to this, in each of the embodiments, a positive optical power is provided in the vicinity of a center of the image. Therefore, the optical power of the surface becomes weaker as the position is shifted to the circumference. As a result, only a weaker optical power is provided to a light beam incident on a significantly oblique surface, thereby preventing the occurrence of aberration. Thus, it is possible to realize an image display apparatus including a smaller scanning optical system capable of displaying a high-quality image.

According to the embodiments, the high quality image can be easily displayed on the surface to be scanned. In addition, when the light source including a plurality of light emitting points is used, an image display apparatus capable of scanning the surface to be scanned with light beams from the plurality of light emitting points to form a preferable image at high speed can be obtained.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2005-138524 filed on May 11, 2005, which is hereby incorporated by reference herein.

What is claimed is:

1. An image display apparatus, comprising:
a light source for emitting a modulated light beam based on image information;
a conversion optical system for converting the light beam from the light source into a convergent light beam;
a scanning member for two-dimensionally scanning the light beam from the conversion optical system;
a scanning optical system for imaging the light beam scanned by the scanning member onto a surface to be scanned; and
an ocular optical system for observing a two-dimensional image formed on the surface to be scanned,
wherein the scanning optical system includes a reflective surface which is rotationally asymmetric shape,
wherein the reflective surface of the scanning optical system is a curved surface and has a positive power in a position in which a center light beam is incident on the reflective surface; and
wherein when a radius of local curvature within a vertical section at an intersection closest to the scanning member, of respective intersections between the reflective surface of the scanning optical system and principal rays of respective scanning light beams within the vertical section including a principal ray of the center light beam and a vertical direction, is expressed by Rn, a radius of local curvature within the vertical section at an intersection farthest from the scanning member, of the respective intersections, is expressed by Rf, and a curvature radius ratio φ is expressed by $\phi = Rf/Rn,$ a condition $1 < \phi < 2$ is satisfied.

2. An image display apparatus according to claim 1, wherein when an angle formed between a principal ray of the light beam which is emerged from the conversion optical system and incident on the scanning member and a principal ray of the center light beam traveling from the scanning member to the scanning optical system is expressed by α (degrees), a condition $10 < \alpha < 40$ is satisfied.

3. An image display apparatus according to claim 1, wherein the light beam incident on the scanning member intersects with the center light beam.

4. An image display apparatus according to claim 1, wherein when a magnification of the center light beam within a vertical section is expressed by Pv and a magnification of the center light beam within a horizontal section is expressed by Ph, conditions $1 < Pv < 5$ $1 < Ph < 5$ are satisfied.

5. An image pickup apparatus, comprising:
an image pickup section for obtaining an image of an object; and
an image display section for displaying the image obtained by the image pickup section,
wherein the image display section includes:
a light source for emitting a modulated light beam based on image information;
a conversion optical system for converting the light beam from the light source into a convergent light beam;
a scanning member for two-dimensionally scanning the light beam from the conversion optical system;
a scanning optical system for imaging the light beam scanned by the scanning member onto a surface to be scanned; and
an ocular optical system for observing a two-dimensional image formed on the surface to be scanned,
wherein the scanning optical system includes a reflective surface which is rotationally asymmetric shape,
wherein the reflective surface of the scanning optical system is a curved surface and has a positive power in a position in which a center light beam is incident on the reflective surface; and
wherein when a radius of local curvature within a vertical section at an intersection closest to the scanning member, of respective intersections between the reflective surface of the scanning optical system and principal rays of respective scanning light beams within the vertical section including a principal ray of the center light beam and a vertical direction, is expressed by Rn, a radius of local curvature within the vertical section at an intersection farthest from the scanning member, of the respective intersections, is expressed by Rf, and a curvature radius ratio φ is expressed by $\phi = Rf/Rn,$ a condition $1 < \phi < 2$ is satisfied.

6. An image pickup apparatus according to claim 5, further comprising an image distortion correction circuit for electrically correcting distortion of the two-dimensional image formed on the surface to be scanned.

7. An image display apparatus, comprising:
a light source for emitting a modulated light beam based on image information;
a conversion optical system for converting the light beam from the light source into a convergent light beam;

a scanning member for two-dimensionally scanning the light beam from the conversion optical system;

a scanning optical system for imaging the light beam scanned by the scanning member onto a surface to be scanned; and an ocular optical system for observing a two-dimensional image formed on the surface to be scanned, wherein the scanning optical system includes a reflective surface which is rotationally asymmetric shape, wherein the reflective surface of the scanning optical system is a curved surface and has a positive power in a position in which a center light beam is incident on the reflective surface; and wherein when a radius of local curvature at a position on the reflective surface of the scanning optical system on which the center light beam is incident within a vertical section is expressed by RY and a radius of local curvature within a horizontal section orthogonal to the vertical section is expressed by RX, a condition $$RY>RX$$

is satisfied.

8. An image pickup apparatus, comprising:

an image pickup section for obtaining an image of an object; and an image display section for displaying the image obtained by the image pickup section, wherein the image display section includes:

a light source for emitting a modulated light beam based on image information;

a conversion optical system for converting the light beam from the light source into a convergent light beam;

a scanning member for two-dimensionally scanning the light beam from the conversion optical system;

a scanning optical system for imaging the light beam scanned by the scanning member onto a surface to be scanned; and an ocular optical system for observing a two-dimensional image formed on the surface to be scanned, wherein the scanning optical system includes a reflective surface which is rotationally asymmetric shape, wherein the reflective surface of the scanning optical system is a curved surface and has a positive power in a position in which a center light beam is incident on the reflective surface; and wherein when a radius of local curvature at a position on the reflective surface of the scanning optical system on which the center light beam is incident within a vertical section is expressed by RY and a radius of local curvature within a horizontal section orthogonal to the vertical section is expressed by RX, a condition $$RY>RX$$

is satisfied.

9. An image pickup apparatus according to claim 8, further comprising an image distortion correction circuit for electrically correcting distortion of the two-dimensional image formed on the surface to be scanned.

\* \* \* \* \*